United States Patent [19]

Newman et al.

[11] Patent Number: 5,301,288

[45] Date of Patent: Apr. 5, 1994

[54] VIRTUAL MEMORY MANAGEMENT AND ALLOCATION ARRANGEMENT FOR DIGITAL DATA PROCESSING SYSTEM

[75] Inventors: Gary H. Newman, Concord; James W. Franklin, Pepperell, both of Mass.

[73] Assignee: Eastman Kodak Company, Rochester, N.Y.

[21] Appl. No.: 53,843

[22] Filed: Apr. 27, 1993

Related U.S. Application Data

[63] Continuation of Ser. No. 498,007, Mar. 23, 1990, abandoned.

[51] Int. Cl.[5] .................... G06F 12/02; G06F 12/06
[52] U.S. Cl. .................... 395/400; 395/164; 395/166
[58] Field of Search ............... 395/164, 165, 166, 400; 340/799

[56] References Cited

U.S. PATENT DOCUMENTS

| | | | |
|---|---|---|---|
| 4,074,254 | 2/1978 | Belser et al. | 395/166 |
| 4,258,040 | 8/1981 | Carlson et al. | 395/400 |
| 4,296,468 | 10/1981 | Bandoh et al. | 395/400 |
| 4,356,549 | 10/1982 | Chueh | 395/400 |
| 4,439,760 | 3/1984 | Fleming | 340/799 |
| 4,466,056 | 8/1984 | Tanahashi | 395/275 |
| 4,481,576 | 11/1984 | Bicknell | 395/400 |
| 4,533,942 | 8/1985 | Gall et al. | 358/78 |
| 4,618,858 | 10/1986 | Belch | 340/724 |
| 4,633,415 | 12/1986 | Vink et al. | 340/726 |
| 4,638,426 | 1/1987 | Chang et al. | 395/400 |
| 4,679,038 | 7/1987 | Bantz et al. | 340/721 |
| 4,680,700 | 7/1987 | Hester et al. | 395/400 |
| 4,703,317 | 10/1987 | Shiomi et al. | 340/723 |
| 4,729,028 | 3/1988 | Micic et al. | 358/183 |
| 4,739,405 | 4/1988 | Sumida | 358/160 |
| 4,758,951 | 7/1988 | Sznyter, III | 395/400 |
| 4,779,135 | 10/1988 | Judd | 358/183 |
| 4,800,489 | 1/1989 | Moyer et al. | 395/400 |
| 4,815,010 | 3/1989 | O'Donnell | 395/166 |
| 4,845,663 | 7/1989 | Brown et al. | 395/400 |
| 4,920,504 | 4/1990 | Sawada et al. | 395/166 |

OTHER PUBLICATIONS

Thakkar et al., "A High-Performance Memory Management Scheme", Computer, May 1986, pp. 8-19.

Neil Trevett, "Interactive Processing of Large Images", Advanced Imaging, Jan. 1989, pp. 51, 52, 56.

Ben Tsutom Wada, "A Virtual Memory System for Picture Processing", May 1984, vol. 27 No. 5, Communications of the ACM, pp. 444-454.

Henry M. Levy et al, "Virtual Memory Management in the VAX/VMA Operating System", Mar. 1982, Computer, pp. 35-41.

*Primary Examiner*—Joseph L. Dixon
*Assistant Examiner*—Michael A. Whitefield
*Attorney, Agent, or Firm*—Milton S. Sales

[57] ABSTRACT

Virtual address space for array data to be stored in a virtual memory is allocated by establishing a table that associates segments of the virtual address space with predetermined array data dimensions and maintaining a map that identifies, for each segment, which portions of the segment have been allocated to store array data. The table and map are used to identify a contiguous portion of the virtual address space for the array data to be stored.

46 Claims, 10 Drawing Sheets

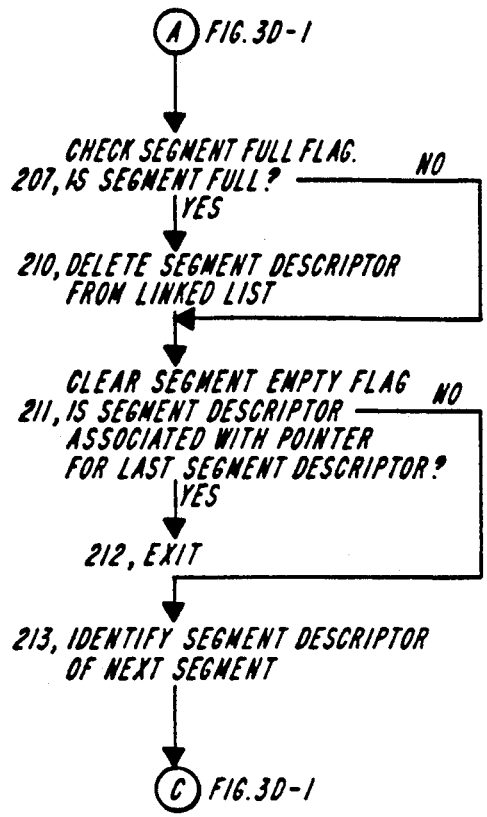
*FIG. 3D-2*
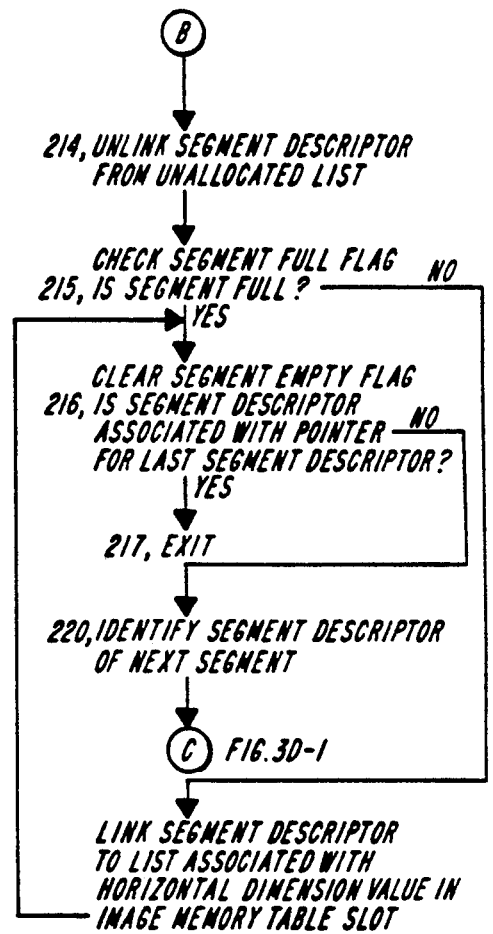
*FIG. 3D-3*
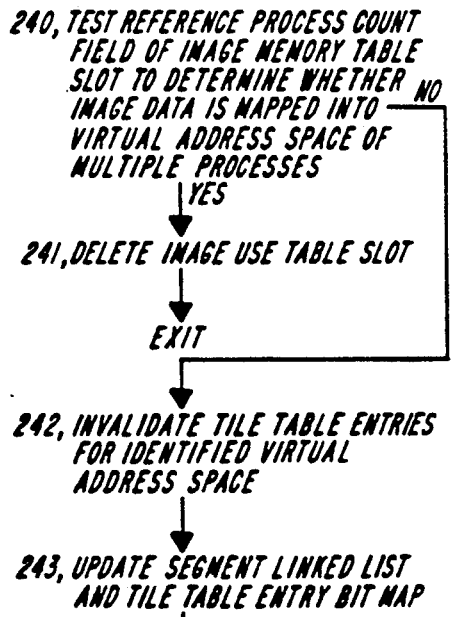
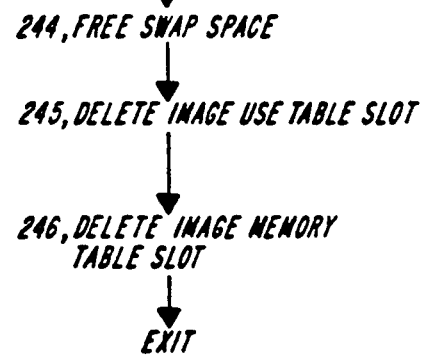
*FIG. 4A*

VIRTUAL MEMORY MANAGEMENT AND ALLOCATION ARRANGEMENT FOR DIGITAL DATA PROCESSING SYSTEM

This is a continuation of application Ser. No. 07/498,007, filed Mar. 23, 1990 now abandoned.

INCORPORATION BY REFERENCE

U.S. patent application Ser. No. 07/300,783, filed Jan. 23, 1989, entitled "Virtual Memory Management Arrangement For Addressing Multi-Dimensional Arrays In A Digital Data Processing System," in the name of Gary H. Newman and assigned to the assignee of the present application, incorporated herein by reference.

FILED OF THE INVENTION

The invention relates generally to the field of computer systems, and more particularly to computer systems providing virtual memory management support for applications programs.

BACKGROUND OF THE INVENTION

A typical computer system includes three basic elements, namely, a processor, a memory and an input/output system. The memory stores information, including data and instructions for processing the data, in a plurality of addressable storage locations. The processor enables information to be transferred, or fetched, to it, interprets the incoming information as either instructions or data, and processes the data in accordance with the instructions. The processor then transfers the processed data to addressed locations in the memory for storage.

The input/output system also communicates with the memory and the processor in order to transfer information into the computer system and to obtain the processed data from it for, for example, printing or display to an operator. Units comprising the input/output system normally operate in accordance with control information supplied to them by the processor. The control information defines the operations to be performed by the input/output units. Typical units comprising the input/output system include, for example, printers, video display terminals, and secondary information storage devices such as disk and tape storage units.

In a number of computer systems, virtual memory arrangements have been provided which permit the programmer to write an applications program without having to be concerned either about the amount of physical memory (that is, the number of addressable storage locations) actually included in the system, or other applications programs that the system may be processing concurrently. Virtual memory arrangements permit the programmer to generate an application, including the applications program and data, which may be many times larger than the amount of physical memory which may be included in a practical system.

In a typical computer system that provides a virtual memory arrangement, the computer executes each applications program in the context of a process, with each process having an associated virtual address space. The virtual address space, in turn, has a plurality of virtual addressable locations each identified by a virtual address. Each process's virtual address space is divided into equal-sized pages, and the physical address space of the computer's memory is divided into equally-sized blocks, with the number of storage locations in a block corresponding to the number of addressable locations in a page of virtual address space. Normally, pages containing most of the information, including the program's instructions and data, in a process' virtual address space are maintained on a secondary storage device, and transferred, under control of an operating system program, to blocks in the physical memory as they are needed. Typically, when information is transferred between physical memory and the secondary storage, the amount of information that is transferred corresponds to that which will fill an integral number of blocks when information is transferred to the memory, or from an integral number of blocks when information is transferred from the memory for storage in the secondary storage.

The size of a process's virtual address space may not be fixed, but instead may vary depending on the applications program's requirements. During processing, an applications program may need to increase the size of its virtual address space to accommodate additional data which it may be processing. A program, to increase the size of its process's virtual address space, issues a call to the operating system, which, in turn, determines whether the computer system contains sufficient resources to accommodate the increased virtual address space. In this operation, the operating system, for example, determines whether the secondary storage contains sufficient unused storage space to permit it to handle the increase in the virtual address space. In addition, an applications program may give up a portion of its virtual address space when it is finished with the processing of blocks of data, which, among other things, enables the operating system to free the storage space in secondary storage.

SUMMARY OF THE INVENTION

One general aspect of the invention is allocating virtual address space for array data to be stored in a virtual memory by establishing a table that associates segments of the virtual address space with predetermined array data dimensions; the table is used to identify a contiguous portion of the virtual address space for the array data to be stored. As used here, the term "dimensino" refers to a measure of the number of data items along one direction in a data array.

Preferred embodiments include the following features.

A map identifies, for each segment, which portions of the segment have been allocated to store array data.

The table includes lists of records for segments that have been at least partially allocated, each list being associated with a different array data dimension. The records in each list are each associated with a segment which has been at least partially allocated to store array data having the dimension associated with that list. The table also includes a list of records for segments that have not been allocated at all.

The records in each list identify another record in the list so that the list is a linked list of records and is thus easily searched to locate segments. Each record also identifies the segment associated with the record and indicates whether that segment has or has not been allocated to store array data. In one embodiment, the record identifies whether the segment is full or empty.

The segments are contiguous within the virtual address space and each segment comprises a predetermined number of contiguous blocks for storing array data. The map is arranged to identify which blocks have been allocated. In one embodiment, the map includes an entry for each segment and a plurality of elements in each entry that are associated with the plurality of blocks in the segment. Each element indicates whether the associated block has been allocated.

The array data to be stored has a predetermined dimension, and a contiguous portion of virtual address space for the data is identified in the following manner. The lists of records are used to identify segments that have been at least partially allocated to store array data having that dimension. If no such segments can be found, an unallocated segment is found using the list of records for unallocated segments. The segment or segments found using the table in this manner are "candidate" segments for storing the array data.

Then, the elements of the bit map entries that correspond to the candidate segments are tested to identify one or more contiguous elements that are associated with one or more contiguous blocks that have not been allocated, and a determination is made as to whether those blocks define a dimension that is at least as large as the predetermined dimension of the array data to be stored.

When the contiguous portion of virtual address space is identified and allocated, if a previously unallocated segment is used the record associated with the segment is moved from the unallocated list to the list of records that correspond to the dimension of the array data. If no such list exists for that dimension, the list is created using the moved record. Likewise, the map is updated by causing the elements that correspond to the blocks in the contiguous portion of virtual address space that has been allocated to indicate that these blocks are now allocated.

The table and map are also used to free (i.e., deallocate) a contiguous portion of virtual address space when array data stored in that portion is to be removed from memory. The lists of records are used to identify a segment that contains at least some of the virtual address space to be freed, and the entry of the map that is associated with that segment is accessed to identify contiguous elements that are associated with the blocks that comprise the portion of the virtual address space to be freed. Each one of these elements is updated to indicate that its associated block is no longer allocated to store array data. Then, the record or records that identify segments that correspond to entries in the map that contain the updated elements are revised if necessary to indicate that space in those segments has been deallocated.

The invention provides a efficient technique for allocating virtual address space. Because space is allocated in contiguous portions, the array data (e.g., data for an image) is located in a single area of virtual address space, rather than in several smaller, separate areas of virtual address space. This greatly facilitates translation of virtual addresses of the array data to physical addresses, thereby increasing the efficiency of data storage and retrieval in the virtual memory. In addition, the contiguous storage technique makes it easy to deallocate portions of the virtual address space when necessary and to keep track of which regions of the virtual address space are free and which portions have been allocated.

Other features and advantages of the invention may become apparent from the following detailed description, and from the claims.

BRIEF DESCRIPTION OF THE DRAWINGS

FIGS. 3A-1 through 4B-3 depict flow diagrams of the operation of the memory management arrangement depicted in FIG. 1.

DETAILED DESCRIPTION OF AN ILLUSTRATIVE EMBODIMENT

Figure 1:
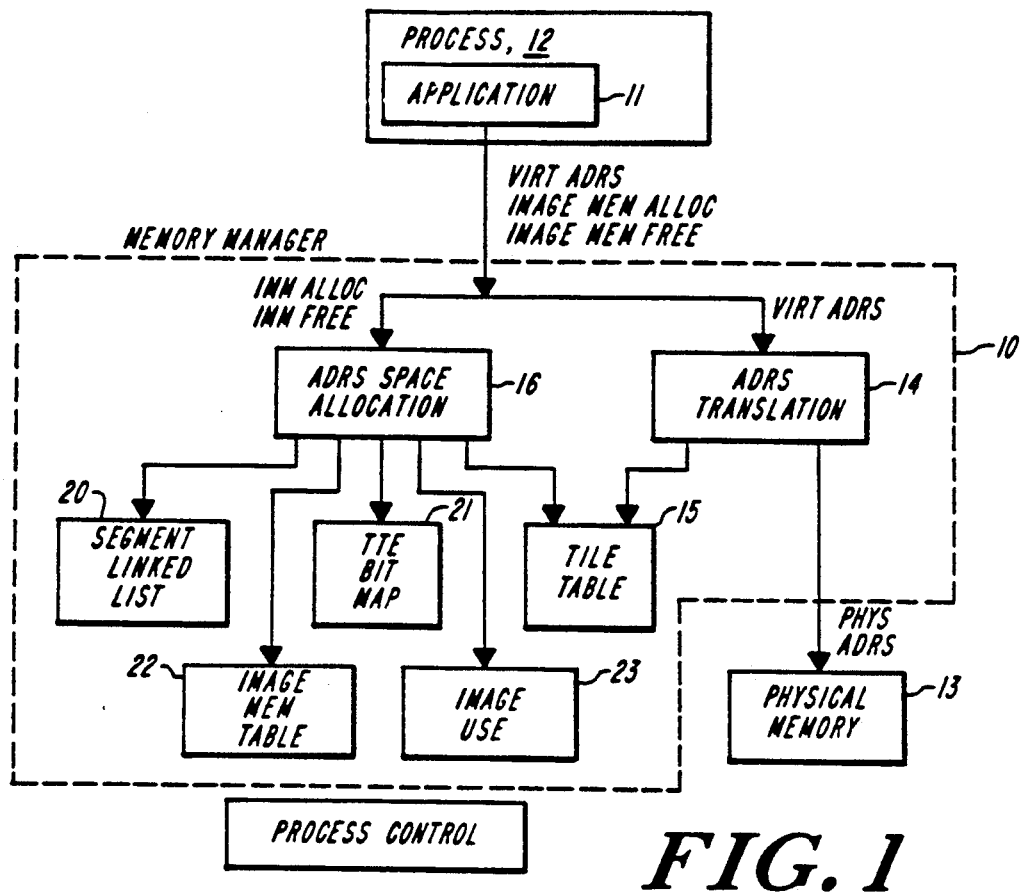
FIG. 1 is a functional block diagram of a digital data processing system including a memory management arrangement in accordance with the invention.

FIG. 1 is a functional block diagram of a digital data processing system including a memory management arrangement 10 in accordance with the invention. The digital data processing system includes a memory management arrangement 10 that receives memory management requests from one or more application programs 11. Each application program operates in the context of one or more processes 12, with each process 12 having a virtual address space defined by a range of virtual addresses. In one specific embodiment which will be described herein, the applications programs 11 perform processing operations in connection with data, in the form of two-dimensional arrays, representing images, with each data element of an array providing image data for a picture element (pixel) of the image.

An application program 11 may issue several types of memory management requests. One type of memory management request enables the application program il, through the memory management arrangement 10, to access a physical memory 13 to retrieve data from, or store processed data in, storage locations in the physical memory. In this type of memory management request, the application program 11 provides a VIRT ADRS virtual address, which identifies a virtual storage location in its virtual address space, to the memory management arrangement 10, and particularly to an address translation module 14. The address translation module 14, using a tile table 15 associated with the process 12, performs a translation operation to map the VIRT ADRS virtual address from the application program 11 to a PHYS ADRS physical address which is used in accessing the physical memory 13. The PHYS ADRS physical address identifies a physical storage location in the physical memory 13 from which data may be transferred to the application program 11 or to which data from the application program 11 is stored.

As is conventional, a virtual storage location identified by a VIRT ADRS may not be present in the physical memory 13, but instead may be present in a secondary storage subsystem (not shown). When that occurs, the memory management arrangement 10 enables a portion of the program's virtual address space to be swapped from the secondary storage subsystem into the physical memory 13, and then generates the PHYS ADRS physical address for use in accessing the physical memory.

An applications program 11 may also generate several other types of memory management requests, including an IMAGE MEM ALLOC image memory allocate request and an IMAGE MEM FREE image memory free request. An applications program 11 uses the IMAGE MEM ALLOC image memory allocation request to obtain additional virtual memory space to accommodate data defining an image prior to processing it, and may use the IMAGE MEM FREE image memory free request to free a portion of its virtual memory space associated with an image after it is finished processing it.

Generally, an address space allocation module 16 in the memory management arrangement 10 receives an IMAGE MEM ALLOC image memory allocate request and initially determines whether the computer system can accommodate the additional virtual address space requested by the applications program 11. In this operation, the address space allocation module 16, if necessary, determines, in a conventional manner, whether the computer system has sufficient resources, most particularly space in its secondary storage, to accommodate the additional virtual address space requested in the IMAGE MEM ALLOC image memory allocate request. The secondary storage space is necessary to accommodate swapping of the image data which may be stored in the additional virtual address space between physical memory 13 and the secondary storage.

If the address space allocation module 16 determines that the computer system has sufficient resources to accommodate the additional virtual address space, it attempts to locate a contiguous portion of the process's virtual address space for the image data. If the address space allocation module 16 can locate a contiguous portion of the process's virtual address space to accommodate the image data, it establishes entries in the tile table 15 which enable the address translation module 14 to generate physical addresses in response to virtual addresses from the applications program 11 for the portion of the process's virtual address space allocated to the image. The detailed operations performed by the address space allocation module 16 in this operation are described below in connection with FIGS. 3A-1 through 3D-3.

The address space allocation module 16 also receives an IMAGE MEM FREE image memory free request from an applications program 11 and, in response thereto, frees the portion of the process's virtual address space containing the image data. Generally, the address space allocation module 16 may free the computer system resources, particularly the secondary storage, which were devoted to the virtual address space for the image. In addition, the address space allocation module 16 performs operations, described below in connection with FIGS. 4A through 4B-3, which effectively disable the applications program 11 from accessing that portion of its virtual address space. In this, the address space allocation module 16 invalidates the entries in the tile table 15 for the image data, thereby disabling the address translation module 14 from using them in generating physical addresses in response to virtual addresses from the applications program 11.

It will be appreciated that under some circumstances the address space allocation module 16 may not need to determine whether the computer system has sufficient resources to accommodate the virtual address space for the image data in response to an IMAGE MEM ALLOC image memory allocate request. If, for example, multiple applications programs 11 are sharing image data, the image data will be mapped into the process's virtual address space of all of the applications programs 11, but normally only one copy will be stored in secondary storage. Thus, after the address space allocation module 16 determines, in response to an IMAGE MEM ALLOC image memory allocation request from one applications program 11, that the computer system has sufficient resources to accommodate the virtual address space for the image data for that applications program 11, it will not normally have to repeat the operation for subsequent applications programs 11 if the resources are shared among the applications programs 11. Contrariwise, when the image data is being shared among multiple applications programs 11, if one applications program 11 issues an IMAGE MEM FREE image memory free request to release the portion of its process's virtual address space for that image data, the address space allocation module 16 generally does not free the system resources containing the image data if that would make the image data unavailable to the other applications programs 11 sharing it.

The address space allocation module 16 generates and uses several data structures, including a segment linked list 20 and a tile table entry bit map 21 for locating a contiguous portion of a process's virtual address space to accommodate image data for an image. In addition, the address space allocation module 16 establishes entries in an image memory table 22 and image use table 23 which identify processes in whose virtual address spaces image data for the various images have been mapped.

Before proceeding further, since the system depicted in FIG. 1 is used in connection with the virtual memory management arrangement described in the aforementioned U.S. patent application Ser. No. 07/300,783 (the "Newman application"), it would be helpful to describe the arrangement described therein. In that arrangement, data arranged in a multi-dimensional array is divided into sub-arrays each having a predetermined number of data items along each dimension. In a two-dimensional array in the arrangement described in the Newman application, a sub-array corresponds to a tile in two dimensional image data in the system described here, a tile comprising the minimum unit of transfer between secondary storage and physical memory 13 during a swapping operation. In one specific embodiment, each pixel in an array of image data is identified by a virtual address comprising a predetermined number of bits identifying the virtual location of the pixel in the vertical direction, and a variable number of bits identifying the virtual location of the pixel in the horizontal direction. Each tile contains 64K ("K"=1024 virtual storage locations) pixels organized in a 256-pixel by 256-pixel array; thus, within each tile, each pixel may be identified by an eight-bit portion identifying the offset into the tile of the pixel in the vertical direction and a second eight-bit portion identifying the offset into the tile of the pixel in the horizontal direction.

Each tile also has a virtual address identifying the offset, from a base virtual address, of the tile into the image data, with each tile having a virtual address including an eight-bit portion identifying the offset into the image data of the tile in the vertical direction and a portion comprising a variable number of bits identifying the offset into the image data of the tile in the horizontal direction. The number of bits comprising the horizontal offset of the tile into the image data, which also identifies the number of tiles in the horizontal direction of an image, that is, its horizontal tile dimension, is identified by a high-order portion of the virtual address.

In that embodiment, the image data is stored in a 1G ("G"=1,073,741,824 virtual storage locations) portion of a process's virtual address space, which in turn is divided into two hundred and fifty-six 4M ("M"=1,048,576 virtual storage locations) segments, and the high-order portion of the virtual address also identifies one or more successive segments of virtual address space which contains the image data. Thus, since the segment identifier, that is, the high-order portion of the virtual addresses for the pixels in an image, identifies the number of tiles in the horizontal direction in an image, which is determined by the number of horizontal address bits, those numbers will be the same for all images which may be stored in a segment.

With this background, returning to FIG. 1, the segment linked list 20 identifies, for each of the 4M segments of a process's virtual address space, the number of bits of the virtual address that comprise the horizontal tile offset, and the tile table entry bit map 21 identifies, for each 64K virtual storage locations comprising a tile, whether they have been allocated to an image. Pixel data defining an image may be entirely located within one segment or in multiple successive segments in a process's virtual address space. In addition, a segment may store pixel data defining one image or multiple images.

In response to an IMAGE MEM ALLOC image memory allocation request from an applications program 11 in a process 12, the address space allocation module 16 accesses segment linked list 20, which contains descriptors for each segment in a process's virtual address space, and uses the descriptors to associate the segments with particular numbers of tiles in the horizontal direction in an image. Allocation module 16 then uses tile table entry bit map 21 to identify which of the 64K tiles in each segment have been allocated to images.

Figure 2A:
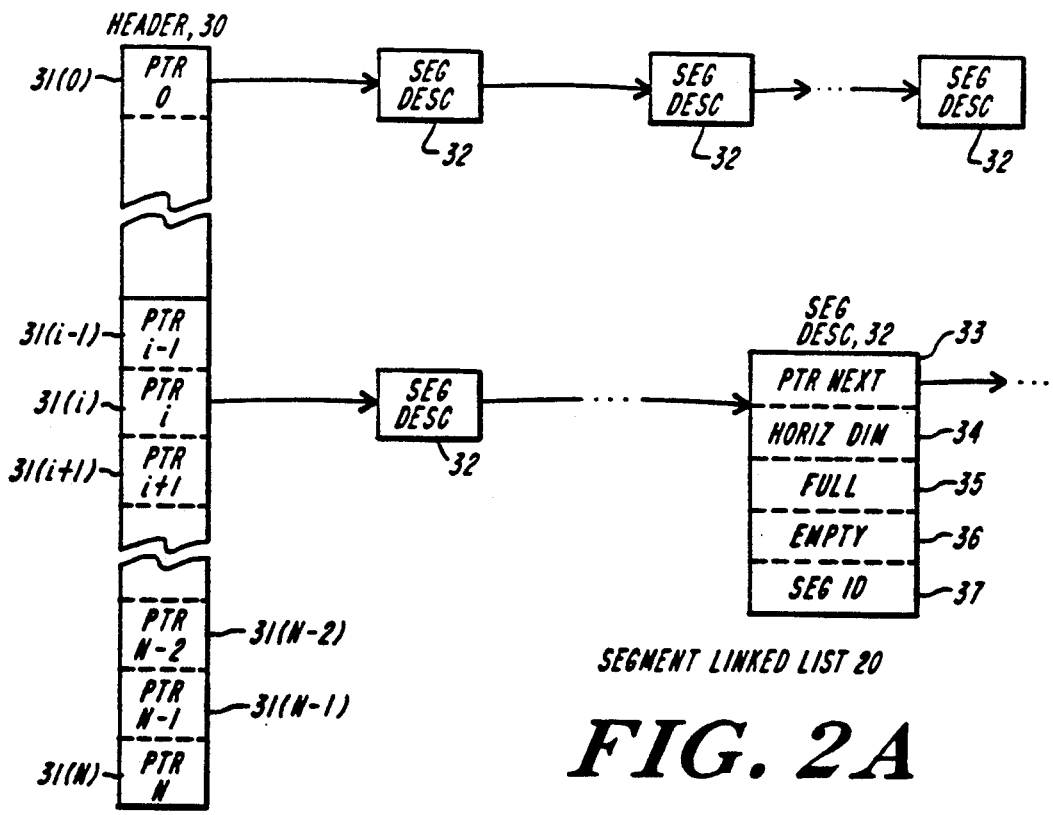
FIGS. 2A through 2E depict data structures used in the memory management arrangement depicted in FIG. 1.
Figure 2B:
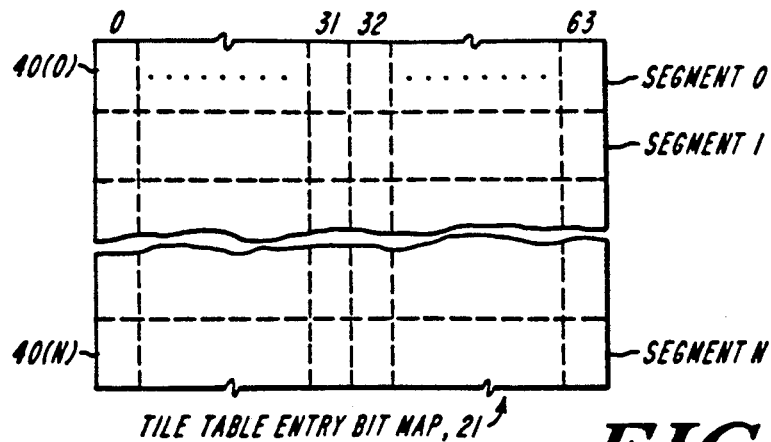

The structure of a segment linked list 20 is depicted in FIG. 2A, and the structure of a tile table entry bit map 21 is depicted in FIG. 2B. With reference to FIG. 2A, segment linked list 20 includes a header 30 including a plurality of entries 31(0) through 31(N) (generally identified by reference numeral 31), and a plurality of segment descriptors generally identified by reference numeral 32. In one embodiment, the segment descriptors 32 for the consecutive segments are stored in an array, so that successive segment descriptors 32 are associated with successive segments. In addition, the segment descriptors 32 are arranged in a plurality of linked lists each associated with a particular horizontal tile dimension to which they have been allocated, and an additional linked list for segment descriptors 32 associated with unallocated segments. The segment linked list 20 comprises a plurality of linked lists each defined by a pointer 31 in the header 30. The pointer 31(0) points to segment descriptors 32 for unallocated segments, and the other pointers 31(1) through 31(N) in the header 30 are each associated with one of the diverse horizontal tile dimensions which the images may comprise. Thus, the pointer 31(i) may point to segment descriptors 32 for image data that have (i) tiles in the horizontal dimension, if any segments have been allocated thereto, or alternatively will contain a null value indicating that no segments have yet been allocated thereto. If a segment has been completely allocated, the segment descriptor therefor may be removed from the segment linked list 20.

The segment descriptors 32 all have the same structure, and only one is shown in detail in FIG. 2A. Each segment descriptor 32 has several elements, including a pointer next field 33 that contains a pointer to a next segment descriptor 32, thereby defining the linked list. A horizontal dimension field 34 identifies the horizontal tile dimension for the segment. A full flag 35 indicates whether or not the segment, identified by a segment identifier field 37, is full, and an empty flag 36 indicates whether the segment is empty.

The structure of a tile table entry bit map 21 is depicted in FIG. 2B. With reference to FIG. 2B, a tile table entry bit map 21 includes a plurality of entries 40(0) through 40(N) (generally identified by reference numeral 40) each of which is associated with one of the segments in the associated process's virtual address space. Each entry 40 includes a succession of bits, associated with the succession of tiles in the corresponding segment, the bits corresponding to flags identifying whether the corresponding tile has been allocated to store image data. In the embodiment described above in connection with the aforementioned Newman application, since the portion of a process's virtual address space allocated to storing images contains two hundred and fifty-six segments, the tile table entry bit map 21 includes two hundred and fifty-six entries 40. In addition, since each segment includes sixty four tiles, each entry 40 includes sixty four bits.

In brief, in response to an IMAGE MEM ALLOC image memory allocate request from an applications program 11, the address space allocation module 16 first uses information, provided in the request, identifying the required number of tiles in the horizontal direction, to identify a pointer 3(i) in the header 30. After locating the required pointer 31(i), the address space allocation module 16 uses the contents of the pointer 31 to determine whether it points to any segment descriptors 32, and, if so, it scans the linked list defined thereby to locate the segment descriptors, and uses the flags 35 and 36 and the tile table entry bit map 21 to determine whether the segments contain sufficient virtual address space, which was not previously allocated, for the requested virtual address space.

If the address space allocation module 16 determines that the segments identified by the descriptors linked to the pointer 31(i) do not contain enough unallocated virtual address space to satisfy the IMAGE MEM ALLOC image memory21 allocate request, or if it determines that the pointer 31(i) does not point to any segment descriptors 32, the address space allocation module 16 uses segment descriptors 32 identified by pointer 31(0), that is, segment descriptors 32 for the virtual address space segments that have not previously been allocated, in allocating the additional virtual address space. In that operation, the address space allocation module 16 unlinks those segment descriptors 32 from the linked list identified by pointer 31(0) and links it to the linked list identified by the pointer 31(i).

Figure 2C:
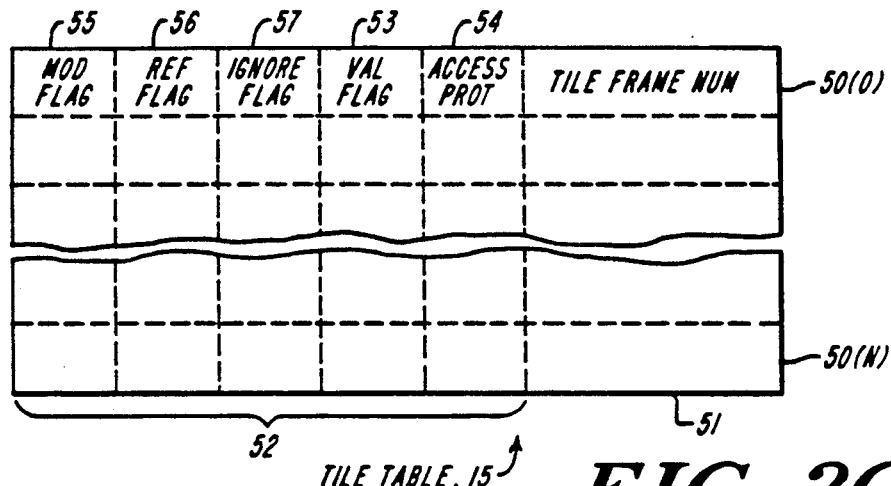

As noted above, after locating a virtual address space segment to satisfy the IMAGE MEM ALLOC image memory allocation request, the address space allocation module 16 generates tile table entries for the tile table 15 that the address translation module 14 uses in translating VIRT ADRS virtual addresses from the application program 11. The structure of a tile table 15 is depicted in FIG. 2C. With reference to FIG. 2C, a tile table 15 includes a plurality of tile table entries 50(0) through 50(N) (generally identified by reference numeral 50), with the succession of tile table entries 50 being associated with successive portions of the virtual address space, each portion comprising sufficient virtual storage locations to accommodate a tile of image data. Each tile table entry 50 includes a plurality of fields, including a tile frame number field 51 and a tile control field group 52. The address translation module 14 uses the contents of the tile frame number field 51 in translating VIRT ADRS virtual addresses into PHYS ADRS physical addresses. If the image data associated with a tile is stored in physical memory 13, the tile frame number 51 comprises high-order bits of the PHYS ADRS physical address for the storage locations for the image data in the tile. On the other hand, if the image data is not in the physical memory 13, the tile frame number 51 provides information as to, for example, the location of the tile data in secondary storage, to facilitate transfer of the image data into physical memory.

The tile control field group 52 of a tile table entry 50 contains information used in controlling use of the tile table entry 50 and in controlling access to the tile, associated with the entry 50, by an application program 11 in process 12. A valid flag 53 indicates whether the tile table entry 50 is valid, that is, if the address translation module 14 can use it in performing a translation operation. An access protection field 54 identifies the operations that an application program 11 can perform in connection with the image data contained in the tile.

The access protection field 54 of a tile table entry 50 indicates whether the image data in the tile is read-only, that is, whether the application program 11 can only read, but not modify, the image data contained in the tile, and whether the image data contained in the tile is to be copied if the application program 11 modifies the image data in the tile. In one embodiment, when the address space allocation module 16 establishes tile table entries 15 in response to an IMAGE MEM ALLOC image memory allocation request, it may load into fields 51 tile frame numbers all of the same value. In that case, all of the tiles in the image will be the same pattern, and only one copy of image data need be provided therefor, with all tile frame numbers pointing thereto.

The tile control field group 52 includes three additional flags, including a modified flag 55, a referenced flag 56 and an ignore flag 57. The modified flag 55 indicates whether the application program 11 has modified the image data comprising the tile associated with the tile frame number 51; if so, the image data must be written from the physical memory 13 to secondary storage at some time. The referenced flag 56 is used to identify whether the image data in the tile has been recently referenced by the application program 11; the referenced flag is used to indicate that the applications program 11 has referenced the associated image data. The ignore flag 57 is used to indicate whether the address should be ignored, possibly allowing the address to be translated by another mechanism.

Figure 2D:
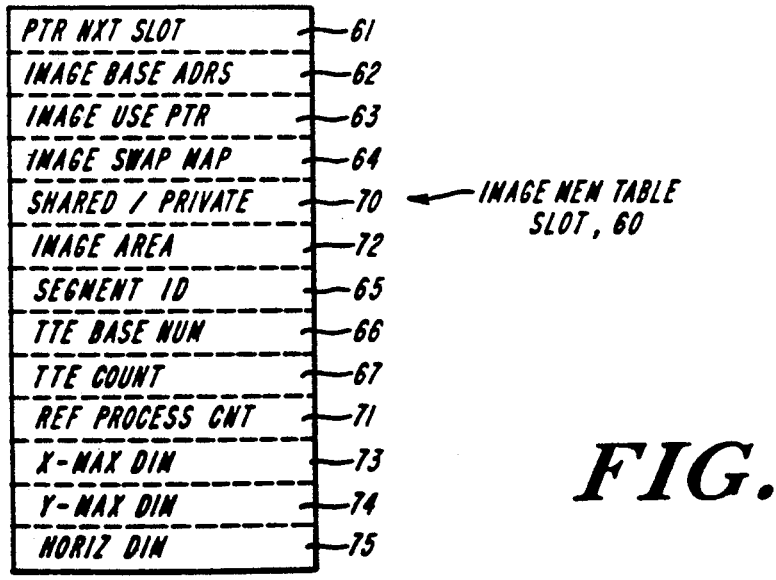
Figure 2E:
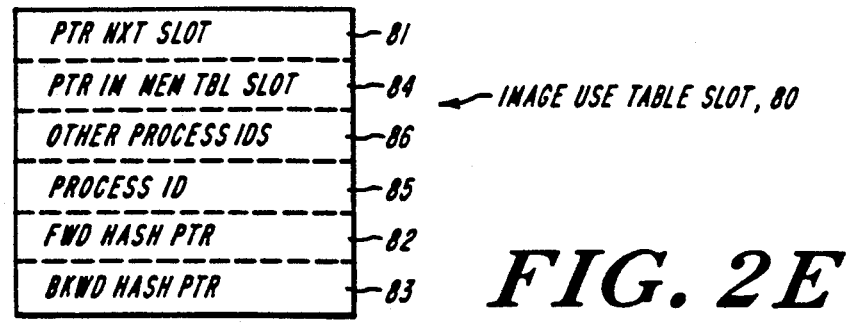

As noted above, the address space allocation module 16 makes use of several other data structures when performing an address space allocation operation, including the image memory table 22 and image use table 23, slots of which are depicted in FIGS. 2D and 2E, respectively. With reference to FIG. 2D, the image memory table 22 is a linked list of slots 60, each having a pointer field 61 to the next slot in the table 22. An image base address field 62, after the allocation operation, contains the base virtual address of the virtual address space for the image. The address space allocation module 16 determines the base virtual address in response to the IMAGE MEM ALLOC image memory allocation request from the application program 11, as described below in connection with FIGS. 3A through 3D-3. An image use pointer 63 points to a slot in the image use table 23 created for the image by the address space allocation module 16 in response to the IMAGE MEM ALLOC image memory allocation request. An image swap map pointer 64 points to the beginning location in the swap device for the virtual address space.

An image memory table slot 60 also includes several entries for segment and tile table entry identification information for the allocated virtual address space. In particular, a segment identification field 65 contains a value identifying the base virtual address space segment, that is, the segment which contains the image base address. A tile table entry base number field 66 contains a value that identifies the first tile table entry 50, and a tile table entry count field 67 contains a value identifying the number of tile table entries 50 in the tile table 15 for the virtual address space allocated for the image associated with the image memory table slot 60.

An image memory table slot 60 also contains information indicating the number of processes which may share the image represented by the data in the virtual address space identified by the image memory table slot. A field 70 contains a value that identifies whether the image data in the virtual address space is shared among a plurality of processes or is private to the process which initially issued the IMAGE MEM ALLOC image memory allocation request. If the field 70 indicates that the image data is shared, a reference process count field 71 identifies the number of processes which share the image data.

An image memory table slot 60 also contains several fields for information which the address space allocation module 16 receives from the IMAGE MEM ALLOC image memory allocation request. The contents of field 72 identify the area of the image whose data is to be stored in the virtual address space which the address space allocation module 16 is to allocate in response to the IMAGE MEM ALLOC image memory allocate request, and the contents of fields 73 and 74 identify the maximum horizontal and vertical dimensions of the image. Finally, a field 75 stores a value corresponding to the horizontal tile dimension, that is, the number of horizontal tiles, to be used in the image.

The image memory table contains one slot 60 for each image whose data is mapped into the virtual address space of any process 12; that is, the image memory table 22 contains one slot for each image even though the data therefor may be mapped into virtual address spaces for a plurality of processes 12. The image use table 23 contains slots 80 that identify the various processes 12 into whose virtual address spaces image data has been mapped. The slots 80 are organized in a linked list in the order in which they were created, as well as a queue based on the process associated with the slot 80. In particular, the slot 80 includes a next pointer field 81 that points to the next slot 80 in the table 23, in the order in which slots 80 are created.

In addition, a slot 80 includes fields 82 and 83 that contain forward and backward pointers linking the slot 80 in a queue based on the process identification of the process 12 which issued the IMAGE MEM ALLOC image memory allocate request. Linking the image use table slots 80 according to process identification simplifies identifying the various images that have been mapped into a process's virtual address space if it is necessary to duplicate the process's virtual address space during, for example, a well-known FORK operation. However, since a system may include a large number of process identification values, and the processes 12 may have relatively few images mapped into their virtual address spaces, rather than having one queue for each possible process identification value, in one embodiment in the image use table 23 the queues are based on hashed process identification values. Thus, the image use table 23 will have fewer queues, but each queue may include slots 80 associated with multiple processes. In one specific embodiment, there are sixty-one queues, and the hashing radix is thus the prime-number sixty one.

Each slot 80 also contains a pointer 84 to the image memory table slot 60 associated with the slot 80, a field 85 whose contents identify the process 12 which issued an IMAGE MEM ALLOC image memory allocate request in response to which the address space allocation module 16 created the slot 80, and a field 86 for identifications of other processes 12 in whose virtual address space the image data has been mapped.

With this background, the operations performed by the address space allocation module 16 in response to an IMAGE MEM ALLOC image memory allocate request and an IMAGE MEM FREE image memory free request will be described in connection with FIGS. 3A through 3D-3 and 4A through 4B-3, respectively. With reference to FIG. 3A-I, in response to an IMAGE MEM ALLOC image memory allocate request, the address space allocation module 16 initially performs a number of operations to determine whether the computer system has sufficient resources to establish the virtual address space for the process 12 of the application program 11 that generated the request. In particular, the address space allocation module 16 initially determines whether the image memory table 22 contains an additional image memory table slot 60 to accommodate the additional image (step 100). If not, it generates an error indication which it returns to the application program 11 (step 101). If the address space allocation module 16 determines that the image memory table 22 has a slot 60 for the image, it determines whether the image use table 23 contains an additional slot 80 (step 102), and if not, also generates an error indication which it returns to the application program 1 (step 103).

If the address space allocation module 16 determines, in steps 100 and 102, that image memory table 22 and image use table 23 contain additional slots 60 and 80, respectively, it sequences to step 104, in which it uses parameters, which the application program 11 provides in the IMAGE MEM ALLOC image memory allocate request, to determine the number of tiles required in the various rows and columns to accommodate the image data, and the maximum number of bits required for the horizontal offset of the tiles into the image data. The address space allocation module 16 thereafter initializes the image memory table slot 60 and image use table slot 80 and loads the values determined in step 104 into the image memory table slot 60 (step 105).

Following step 105, the address space allocation module 16 determines, in a conventional manner, whether the secondary storage contains sufficient swap space to accommodate the additional virtual address space requested by the IMAGE MEM ALLOC image memory allocate request (step 106). If not, the address space allocation module 16 frees the just-created image memory table slot 60 and image use slot 80 and returns an error indication to the application program 11. On the other hand, if the address space allocation module 16 determines that the secondary storage does contain sufficient swap space, it performs conventional operations to reserve and allocate swap space for the additional virtual address space (step 110).

Following step 110, the address space allocation module 16 performs a series of steps to find a contiguous portion of the process's virtual address space to accommodate the request, an load and initialize the tile table entries in tile table 15 to facilitate translation, by the address translation module 14, of virtual addresses to physical addresses for that portion of the virtual address space. In particular, the address space allocation module 16 first locates the virtual address space and allocates as a group a series of tile table entries 50 (step 111, FIG. 3A-2). The details of this operation will be described below in connection with FIGS. 3B-1 through 3C-4. The address space allocation module 16 then determines whether it was able to successfully allocate the required tile table entry group (step 112), and, if not, it frees the image memory table slot 60 and image use table slot 80 that it initialized in step 105 and the swap space that it allocated in step 110, and returns an error indication to the application program 11.

If, however, the address space allocation module 16 determines in step 112 that it successfully allocated a group of tile table entries 50 for the requested additional virtual address space, it initializes the tile table entries 50 (step 114) and determines whether that operation was successful (step 115). If not, the address space allocation module 16 frees the image memory table slot 60 and image use table slot 80 that it initialized in step 105, the swap space that it allocated in step 110, and the group of tile table entries that it allocated in step 111, and returns an error indication to the application program 11 (step 116).

If the address space allocation module 16 was successful in initializing the group of tile table entries 50, the base virtual address in the virtual address space in which the image data will be located is the portion of the virtual address space pointed to by the first tile table entry 50 in the group that was allocated (step 111) and initialized (step 114). The application program 11 will use that base address in its processing of the image data loaded into the virtual address space. The address space allocation module 16 therefore, if it determines, in step 115, that it successfully initialized the group of tile table entries for the requested virtual address space, loads the base address into the image memory table slot 60, particularly in image base address field 62 (step 117), and returns the image base address to the application program 11 that issued the IMAGE MEM ALLOC image memory allocate request (step 120).

Figures 1, 3A:
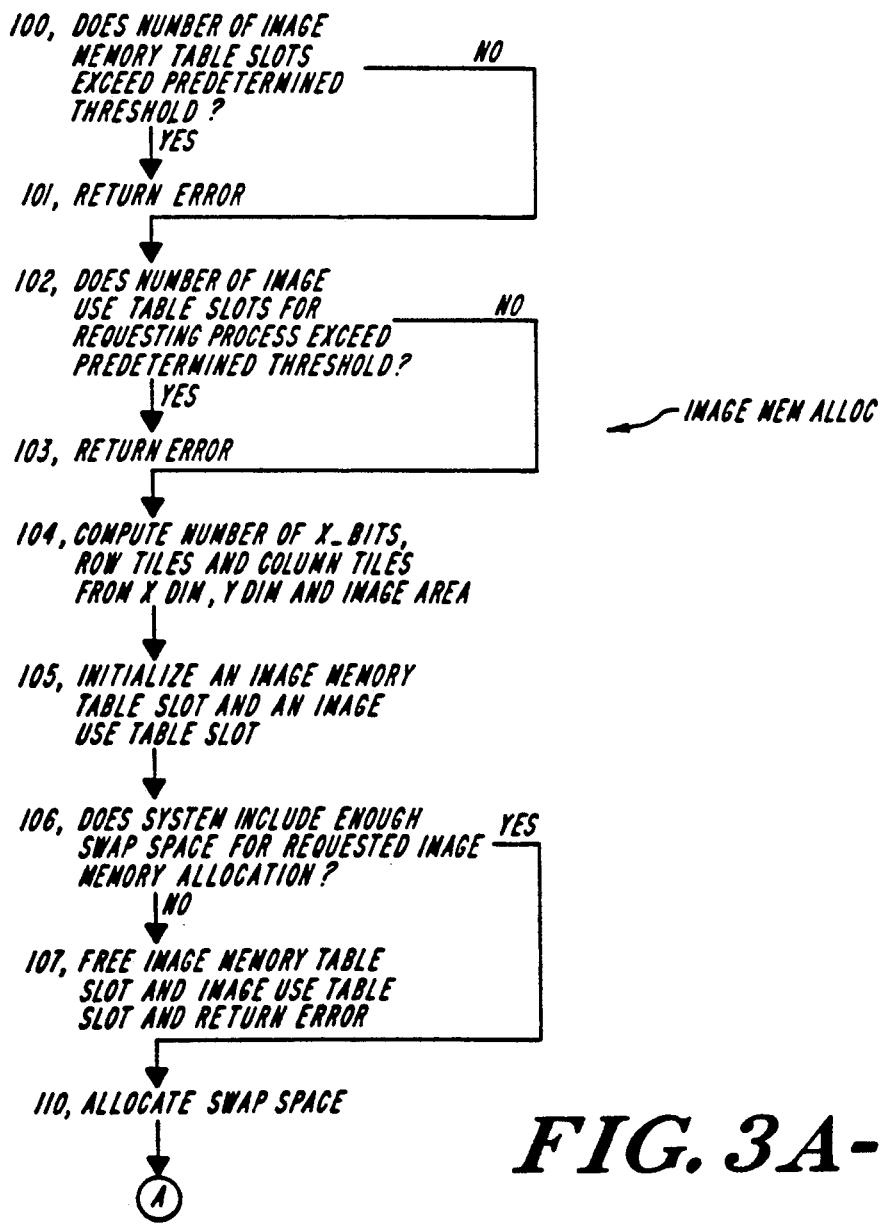
Figures 2, 3A:
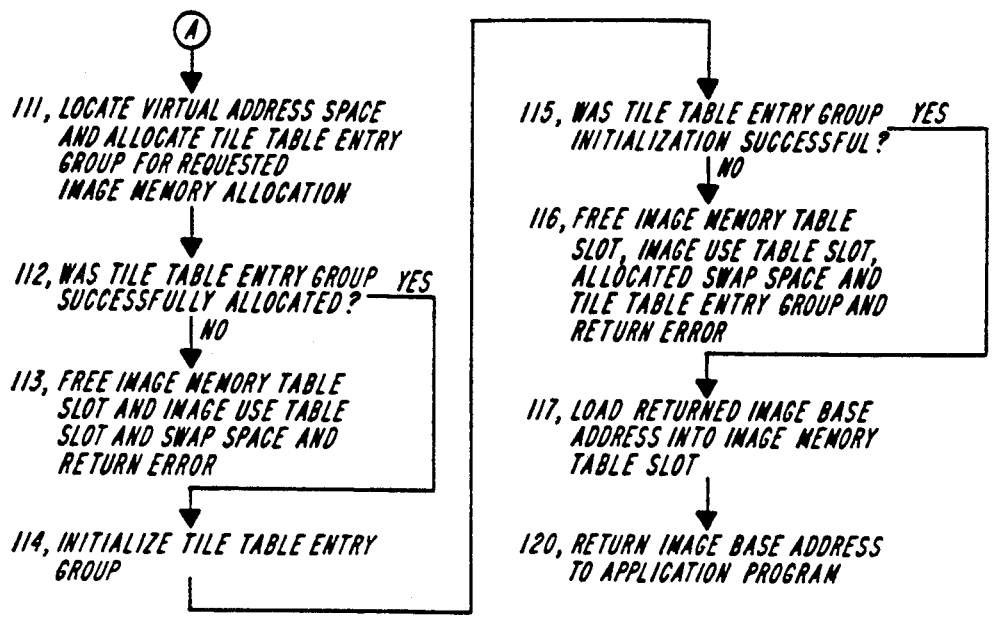
Figures 1, 3B:
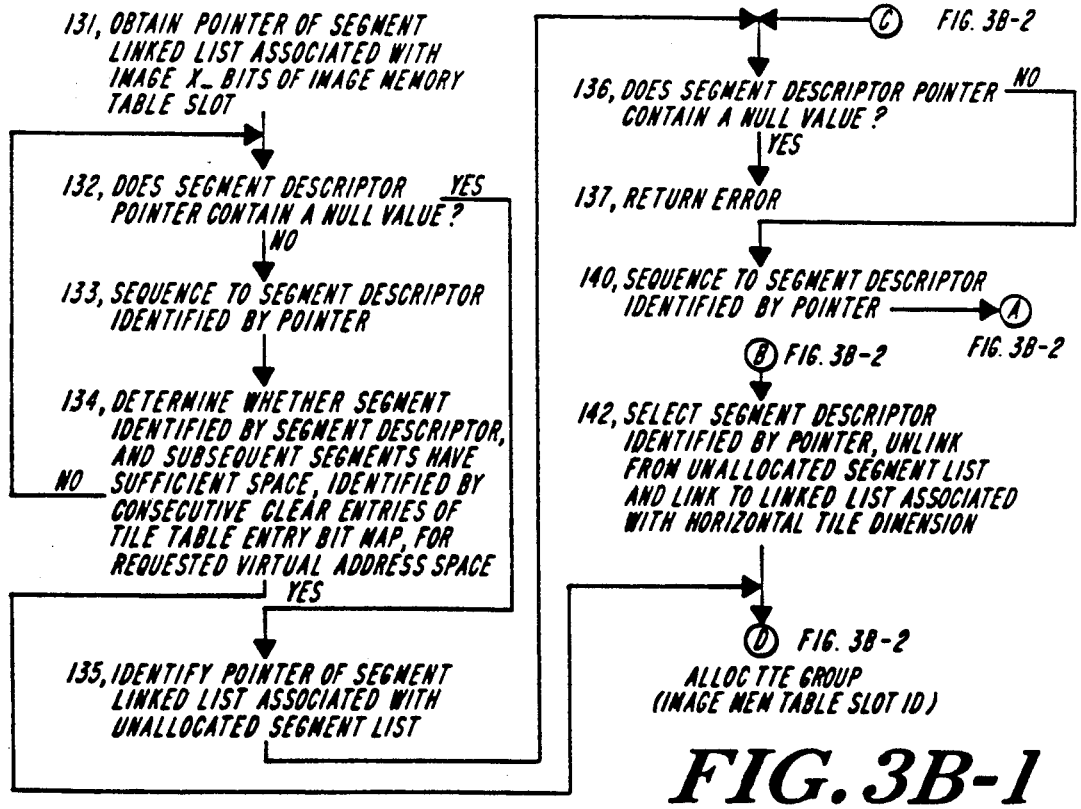
Figures 2, 3B:
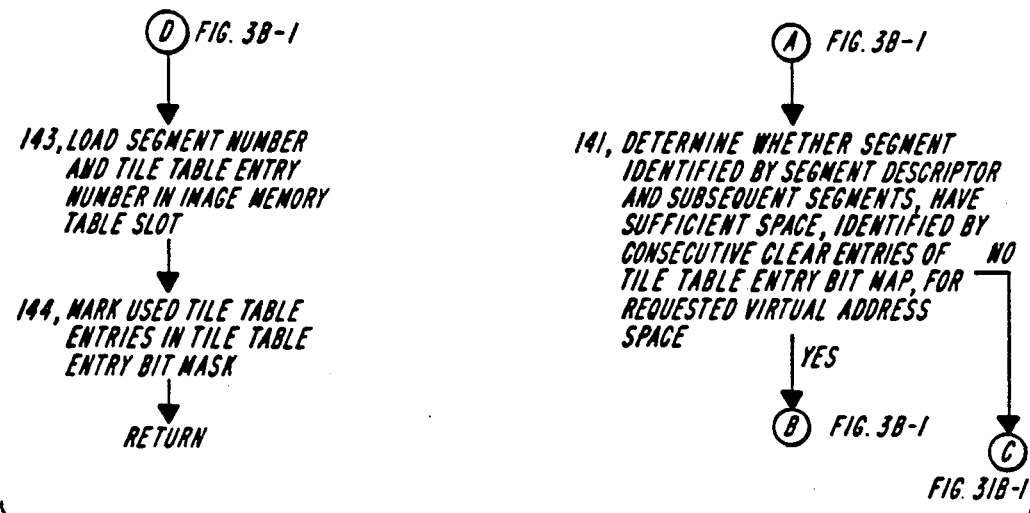

As described above, the address space allocation module 16, in step 111, locates a contiguous portion of virtual address space for the process 12 of the application program 11 that issued the IMAGE MEM ALLOC image memory allocate request, and allocates a group of one or more tile table entries therefor. These operations will be described in detail in connection with FIGS. 3B-1 and 3B-2. With reference to FIG. 3B-1, the address space allocation module 16 first (step 131) obtains the pointer 31 to the segment linked list (FIG. 2A) associated with the horizontal tile dimension of the image data to be stored in the requested virtual address space, that is, the pointer 31 associated with the contents of the field 75 of the image memory table slot 60 created in step 105 (FIG. 3A-1).

The address space allocation module 16 then performs a series of steps 132 through 134 to attempt to locate a contiguous portion of the process's virtual address space to accommodate the image data from segments, identified by segment descriptors 32, already allocated and linked in the list identified by the pointer 31. In particular, the address space allocation module 16 initially determines whether the pointer 31, obtained in step 131, contains a null value (step 132). If so, no segments have previously been allocated in the process's virtual address space for the horizontal tile dimension, and so no segment descriptors have been linked to the pointer 31. However, if the pointer 31 does contain a non-null value, the address space allocation module 16 sequences to the segment descriptor 32 identified by the pointer 31 (step 133) and determines whether the segment associated with that segment descriptor, along with subsequent segments, if necessary, contain sufficient unallocated virtual address space to accommodate the requested virtual address space (step 134). In that operation, which is described below in greater detail in connection with FIGS. 3C-1 through 3C-4, the address space allocation module 16 uses the entries 40 for the various segments in the tile table entry bit map 21 to determine which portions of the various virtual address space segments have not been allocated.

The address space allocation module 16, if it determines in step 134 that a segment associated with a segment descriptor, along with subsequent segments in the process's virtual address space, if necessary, will not accommodate the requested additional virtual address space, sequences to the next descriptor 32 in the linked list defined by the pointer 31. Thus, following step 134, the address space allocation module 16 returns to step 132 to determine if the segment descriptor, which it used in step 134, has a null value in its next pointer field 33 (step 132). If it does, the segment descriptor 32 is the last in the linked list identified by the pointer 31 identified in step 131. On the other hand, if the next pointer field 33 does not contain a null value, the address space allocation module 16 uses the value to identify the next segment descriptor 32 in the linked list which has the required horizontal tile dimension (step 133), and performs step 134 in connection therewith.

The address space allocation module 16 thus iteratively steps through the linked list identified by the pointer 31 identified in step 131, until it locates a segment descriptor whose associated segment, along with subsequent segments, if necessary, contain sufficient unallocated virtual address space to accommodate the requested virtual address space request (step 134), or until it reaches a segment descriptor whose next pointer field 33 contains a null value.

If the address space allocation module 16 is unable to locate, in the linked list identified by the pointer 31 obtained in step 131, a segment which, along with subsequent segments in the process's virtual address space, contain sufficient unallocated virtual address space to accommodate the requested virtual address space, it proceeds to a sequence of steps to obtain the required segments using descriptors in the list identified by pointer 31(0), that is, the segments which have not yet been allocated. In that operation, the address space allocation module 16 performs a series of steps, which are similar to steps 132 through 134 described above, to attempt to locate one or more contiguous previously-unallocated segments, identified by descriptors 32 in the list headed by pointer 31(0), which have sufficient space to satisfy the IMAGE MEM ALLOC image memory allocate request.

In this operation, the address space allocation module 16 initially obtains the pointer 31(0) to the unallocated segment list (step 135) and determines whether that pointer 31(0) contains a null value (step 136). If so, all segments have been allocated, and so the address space allocation module 16 is unable to allocate the requested virtual address space. Accordingly, the address space allocation module 16 returns an error indication to the application program 11 that issued the IMAGE MEM ALLOC image memory allocate request.

If, on the other hand, the address space allocation module 16 determines in step 136 that pointer 31(0) does not contain a null value, it uses the value to identify the segment descriptor (step 140) and determine whether its associated segment, along with subsequent segments, if necessary, contain sufficient unallocated virtual address space to accommodate the requested virtual address space. The address space allocation module 16, if it determines in step 141 that a segment associated with a segment descriptor, along with subsequent segments in the process's virtual address space, if necessary, will not accommodate the requested additional virtual address space, sequences to the next descriptor 32 in the linked list defined by the pointer 31(0). Thus, following step 141, the address space allocation module 16 returns to step 136 to determine if the segment descriptor, which it used in step 141, has a null value in its next pointer field 33 (step 136). If it does, the segment descriptor 32 is the last in the linked list identified by the pointer 31(? ). On the other hand, if the next pointer field 33 does not contain a null value, the address space allocation module 16 uses the value to identify the next segment descriptor 32 in the linked list identifying the unallocated segments (step 140), and performs step 141 in connection therewith.

The address space allocation module 16 thus iteratively steps through the linked list of unallocated segment descriptors identified by the pointer 31(0), until it locates a segment descriptor whose associated segment, along with subsequent segments, if necessary, contains sufficient unallocated virtual address space to accommodate the requested virtual address space (step 141), or until it reaches a segment descriptor whose next pointer field 33 contains a null value. If the address space allocation module 16 determines, in step 136, that either pointer 31(0) or a next pointer 33 contains a null value, it is unable to locate sufficient consecutive virtual address space for the process 12 to satisfy the IMAGE MEM ALLOC image memory allocate request, and so it returns an error to the application program 11 that issued the request.

On the other hand, if the address space allocation module 16 is able to identify, in step 141, one or more segments to satisfy the request, it sequences to step 142 to transfer the segment descriptors therefor from the linked list headed by pointer 31(0) and link them to the list headed by the pointer 31 identified in step 131, that is, the pointer associated with the required horizontal tile dimension. The address space allocation module 16 conditions the full and empty flags 35 and 36 as necessary, and loads horizontal tile dimension information in the field 34.

Following step 142, or step 134 if the address space allocation module 16 is able to find segments to satisfy the request starting with a previously-allocated segment of the required horizontal tile dimension, the address space allocation module 16 inserts the segment identification of the first segment in the segment identification field 65 of the image memory table slot 60 (step 143) and marks the required bits in the entries 40 for the segments in the tile table entry bit map 21 (step 144) and returns to the sequence depicted on FIGS. 3A-i and 3A-2.

Figures 1, 3C:
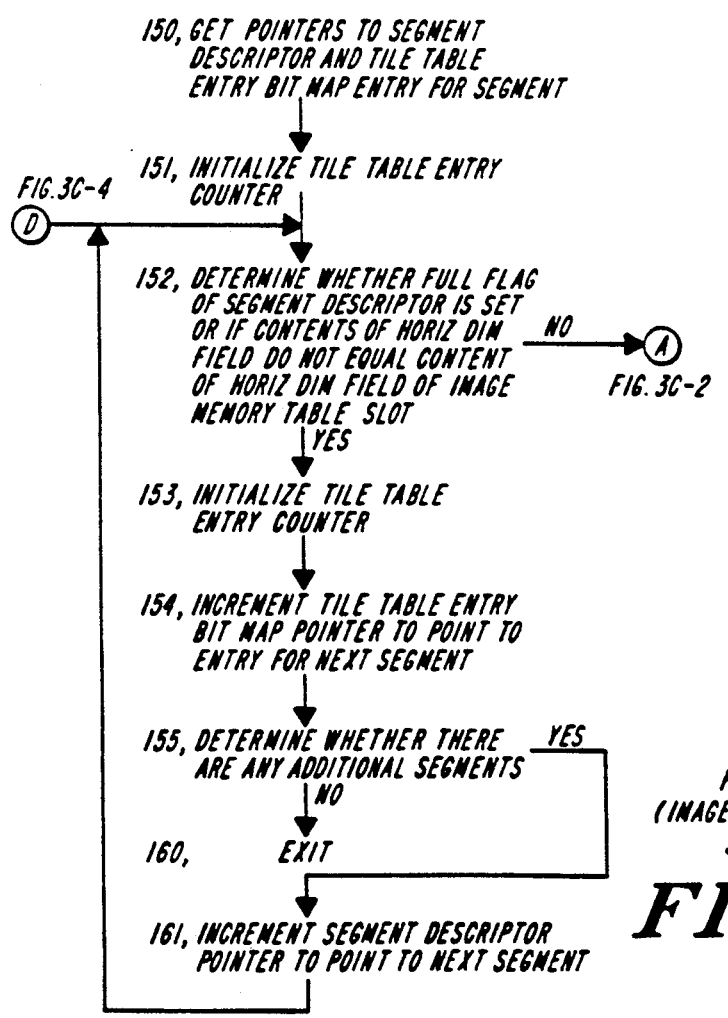
Figures 2, 3C:
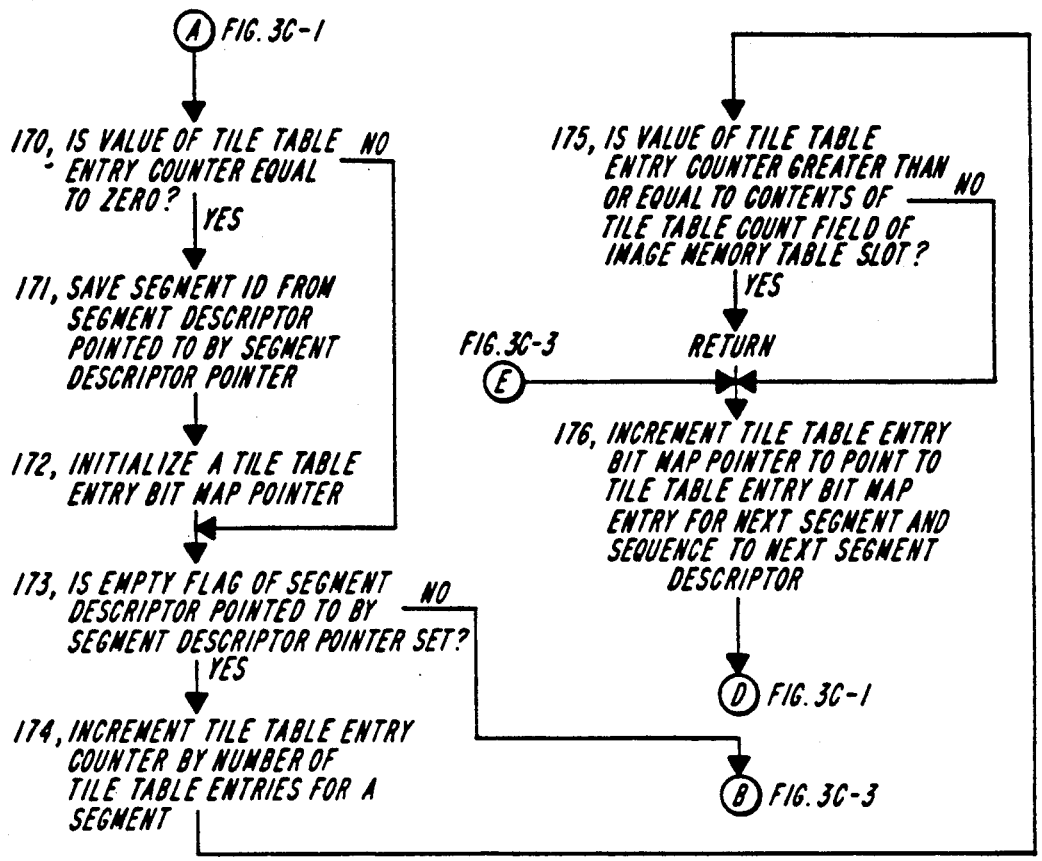

As noted above, in steps 134 and 141 (FIGS. 3B-1 and 3B-2), the address space allocation module 16 attempts to locate one or more contiguous segments in the process's virtual address space to accommodate the requested virtual address space. The detailed operations are depicted in FIGS. 3C-1 through 3C-4. With reference to FIG. 3C-1, the address space allocation module 16 first establishes a pointer to a segment descriptor 32, which is identified in step 133 or 140, and obtains the entry 40 in the tile table entry bit map 21 for the segment (step 150). In addition, the address space allocation module 16 initializes a tile table entry counter (not shown) (step 151), which it uses to count the number of consecutive tile table entries 50, and thus the amount of contiguous virtual address space, that it can locate using the identified segment as the base. Following step 151, the address space allocation module 16 determines whether the segment descriptor's full flag 35 is set or if the contents of its horizontal dimension field 34 do not correspond to the horizontal dimension in field 75 of the image memory table slot 60. If both the segment descriptors' full flag 35 is clear and the contents of the horizontal dimension field 35 correspond to the horizontal dimension in field 75, the segment can be used for the virtual address space allocation. In that event, the address space allocation module 16 sequences to step 170 (FIG. 3C-2) in which it determines whether the value of the tile table entry counter is zero. If the value of the tile table entry counter is zero, the address space allocation module 16 is beginning a new search for required contiguous virtual address space beginning with the segment associated with the segment descriptor, and so the address space allocation module 16 saves the segment identifier from field 37 (step 171). If it turns out, in subsequent processing, that the segment, along with subsequent segments if necessary, contain sufficient unallocated contiguous virtual address space to satisfy the IMAGE MEM ALLOC image memory allocate request, the address space allocation module 16 will load the segment identifier in field 65 of the image memory table slot 60 created for the request. After saving the segment identifier (step 171), the address space allocation module 16 initializes a pointer to the entry 40 in the tile table entry bit map 21 associated with the segment (step 172).

The address space allocation module 16 then tests the empty flag 36 of the segment descriptor 32 to determine whether it is set (step 173). If the empty flag 36 is not set, the segment defined by the segment descriptor has been at least partially allocated, and so the address space allocation module 16 will sequence through the entry 40 in the tile table entry bit map 21 associated with the segment to identify which portions, if any, have not been allocated, which operations are described below in connection with FIGS. 3C-3 and 3C-4. On the other hand, if the empty flag 36 is set, the address space allocation module 16 need not perform these operations, since no portions of the segment have been previously allocated.

Accordingly, if the address space allocation module 16 determines, in step 173, that the empty flag 36 of the segment descriptor is set, it increments the tile table entry counter by a value corresponding to the number of tile table entries in a segment (step 174). The address space allocation module 16 then determines whether the value of the tile table entry counter is greater than or equal to the contents of the tile table entry count field 67 of the image memory table slot 60, which identifies the number of tile table entries required to accommodate the virtual address space requested in the IMAGE MEM ALLOC image memory allocate request (step 175). If the address space allocation module 16 determines that the value of the tile table entry counter is greater than, or equal to, the value in the tile table entry count field 67, it returns with the segment identifier saved in step 171 as the base segment for the requested virtual address space.

If, on the other hand, the address space allocation module 16 determines in step 175 that the value of the tile table entry counter is not greater than or equal to the contents of the tile table entry count field 67 of the image memory table slot 60, it has not located sufficient contiguous virtual address space, and so it increments the tile table entry bit map pointer to point to the entry 40 in the tile table entry bit map 21 for the next segment. In addition, the address space allocation module 16 identifies the next segment descriptor 32 in the array of segment descriptors 32, which is associated with the segment contiguous, in the virtual address space, to the segment associated with the segment descriptor used in step 173, and returns to step 152.

If the address space allocation module 16 determines, in step 173, that the empty flag 36 in the segment descriptor 32 is not set, the segment associated with the segment descriptor has been partially allocated, and so it performs a series of operations to determine the amount of unallocated space in the segment. Initially, the address space allocation module 16 retrieves the entry 40 in the tile table entry bit map 21 associated with the segment (step 177) and determines whether all of the bits in the entry 40 are clear (step 180). If so, the address space allocation module 16 increments the value of the tile table entry counter by a value corresponding to the number of tile table entries in a segment (step 181). The address space allocation module 16 then determines whether the value of the tile table entry counter is greater than or equal to the contents of the tile table entry count field 67 of the image memory table slot 60 (step 182), and if the address space allocation module 16 determines that the value of the tile table entry counter is greater than, or equal to, the value in the tile table entry count field 67, it returns, with the segment identifier saved in step 171 as the base segment for the requested virtual address space (183).

If, on the other hand, the address space allocation module 16 determines in step 182 that the value of the tile table entry counter is not greater than or equal to the contents of the tile table entry count field 67 of the image memory table slot 60, it has not located sufficient contiguous virtual address space, and so it increments the tile table entry bit map pointer to point to the entry 40 in the tile table entry bit map 21 for the next segment (176). In addition, the address space allocation module 16 identifies the next segment descriptor 32 in the array of segment descriptors 32, which is associated with the segment contiguous, in the virtual address space, to the segment associated with the segment descriptor used in step 177, and returns to step 152.

Returning to step 180, if the address space allocation module 16 determines that all bits of the retrieved entry 40 of the tile table entry bit map 21 associated with the segment are not clear, it sequences to step 184 in which it determines whether all of the bits of the entry 40 of the tile table entry bit map 21 are set (step 184). If so, the address space allocation module 16 increments the tile table entry bit map pointer to point to the next entry 40 in the tile table entry bit map 21, that is, the entry 40 associated with the next segment, and returns.

If the address space allocation module 16 determines, in step 184, that all of the bits of the retrieved entry 40 of the tile table entry bit map 21 are not set, it sequences to step 187 to begin a sequence in which it steps through the retrieved entry 40 to identify bits that are clear, which, in turn, identify unallocated portions of the associated segment. For the bits that are set, the address space allocation module 16 resets the tile table entry counter and for those that are clear it increments the counter. Thus, after sequencing through all of the bits in the entry, the value in the tile table entry counter identifies the number of bits at the high end of the segment that are clear, and thus those that are unallocated.

Thus, in step 187, the address space allocation module 16 tests the first bit of the entry 40 to determine if it is set. If the bit is set, the address space allocation module 16 resets the tile table entry counter and increments a tile table entry bit map pointer to point to the next bit in the entry (190). The address space allocation module 16, using the tile table entry bit map pointer, then determines whether it has tested all of the bits in the entry 40 (step 191). If not, the address space allocation module 16 tests the next bit, identified by the tile table entry bit map pointer, and returns to step 190 (step 192). If the address space allocation module 16 determines in step 187 or 192 that the bit is clear, in which case the corresponding portion of the segment has not been allocated, it increments the tile table entry bit map counter (step 193) and compares the value to the contents of the tile table entry count field 67 in the image memory table slot 60 (step 194). If the value of the counter is greater, the required amount of unallocated virtual address space has been located and so the address space allocation module 16 exits. On the other hand, if the value of the counter is less, it returns to step 191.

Steps 187 and 190 through 194 thus form a loop in which the address space allocation module 16 iteratively tests the condition of the successive bits in the entry 40 in the tile table entry bit map 21 associated with the segment, increments the counter when a bit is clear and clears the counter when the bit is set. Thus, if the address space allocation module 16 determines, in step 191, that it has tested all of the bits in the entry 40, the value of the counter identifies the number of successive clear bits at the high end of the segment. At that point the address space allocation module 16 returns to step 152 to perform operations in connection with the segment descriptor of the next segment.

Returning to step 152, it will be appreciated that the address space allocation module 16 iteratively performs the steps described above on successive virtual address space segments, zero or more times until it either (1) locates sufficient unallocated virtual address space, which occurs when the value of the tile table entry counter exceeds the value of the tile table entry count field 67, or (2) locates in step 152 a segment associated with a segment descriptor 32 whose full flag 35 is set or whose horizontal dimension field 34 contains a value that differs from that in field 75 of the image memory table slot 60. If the address space allocation module 16 determines in step 152 that the full flag 35 of the segment descriptor 32 is set or that its horizontal dimension field 34 contains a value that differs from that in field 75 of the image memory table slot 60, it re-initializes the tile table entry counter (step 153) and increments the tile table entry bit map pointer to point to the entry 40 for the next virtual address space segment (step 154) to facilitate processing of the entry 40 for the next segment. The address space allocation module 16 then determines whether there are any additional segments (step 155), and if so, increments the segment descriptor pointer to point to the next segment, and returns to step 152 (step 161). If the address space allocation module 16 determines in step 155 that there are no additional segments, it exits.

Returning to step 144 (FIG. 3B-2), as part of its operation in response to an IMAGE MEM ALLOC image memory allocate operation, the address space allocation module 16 sets the various bits in the entries 40 associated with the allocated virtual address space, and it also links the segment descriptors 32 to the respective linked list as identified by the pointer 31 associated with the horizontal tile dimension. These operations are described in connection with FIGS. 3D-1 through 3D-4. With reference to FIG. 3D-1, the address space allocation module 16 first initializes a pointer to the entry 40 in the tile table entry bit map 21 for the first segment in the virtual address space allocated in response to the IMAGE MEM ALLOC image memory allocate request (step 200). In addition, the address space allocation module 16 initializes a counter with a value, taken from tile table entry count field 67 in the image memory table slot 67, identifying the number of tile table entries that were allocated in response to the request (step 201). The address space allocation module 16 thereafter iteratively sets successive bits in the entries 40 of the tile table entry bit map 21, beginning with the bit identified by the pointer, during each iteration decrementing the counter, until the counter counts out. At that point, the bits associated with the allocated portion of the virtual address space have been set (202).

Thereafter, the address space allocation module 16 performs a series of steps to update the contents of the segment descriptors 32 for the segments in the virtual address space allocated in response to the IMAGE MEM ALLOC image memory allocate call, and to link the descriptors 32 to the proper linked list if necessary. In that operation, the address space allocation module 16 also deletes from the linked list the segment descriptors for completely allocated segments, to simplify operations in response to subsequent IMAGE MEM ALLOC image memory allocate requests. It will be appreciated that the segment descriptors that are deleted from the linked lists remain in the segment descriptor array, since they may be re-linked to the unallocated segment list, identified by pointer 31(0) if the allocated virtual address space is subsequently deallocated in response to an IMAGE MEM FREE image memory free request, described below.

Thus, the address space allocation module 16 first initializes pointers to the segment descriptors 32 associated with the first and last segments, portions of which were allocated (step 203). The address space allocation module 16 then uses a loop to update the contents of the various fields of the descriptors of the allocated fields, including such information as the full and empty flags 35 and 36. In this loop, the address space allocation module first checks if the current segment became full as a result of the allocation operation (step 204). In this operation, the address space allocation module 16 tests the bits in the segment's entry 40 in the tile table entry bit map 21 to determine whether all of the bits are set. If the current segment is full, the segment full flag is set (step 205). The address space allocation module 16 then identifies the segment descriptor 32 associated with the current segment and determines whether the segment descriptor is on the unallocated segment descriptor list, that is, the list headed by pointer 31(0) (step 206). If not, the segment descriptor is already in the list associated with the horizontal tile dimension. In that case, the address space allocation module 16 steps to a sequence depicted in FIG. 3D-2, in which it first checks the segment full flag. If the flag is set (i.e., if the current segment is full), the address space allocation module 16 deletes the descriptor 32 from the linked list (step 210).

Thereafter, or following step 207 if the address space allocation module 16 determines that the segment full flag is not set (i.e., that the segment is not full), it clears the current segment's segment empty flag (as the segment has been allocated and cannot be empty), and then determines whether the segment descriptor is pointed to by the last segment descriptor pointer created in step 203 (step 211). If the address space allocation module 16 determines that the segment descriptor is pointed to by the last segment descriptor pointer (step 211), it has processed all of the segment descriptors and so it exits (step 212).

On the other hand, if the address space allocation module 16 determines, in step 211, that the segment descriptor is not identified by the last segment descriptor pointer, it identifies the next segment descriptor and returns to step 204 to process that segment descriptor 32.

Figures 3, 3C:
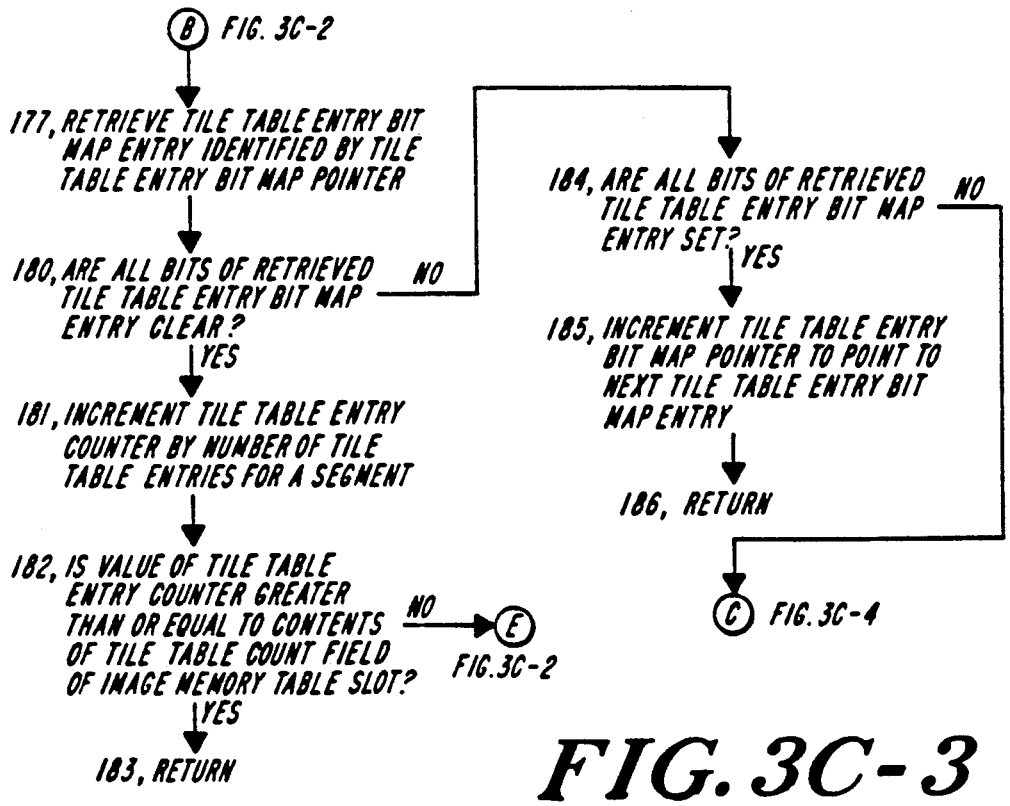
Figures 3, 3C, 4:
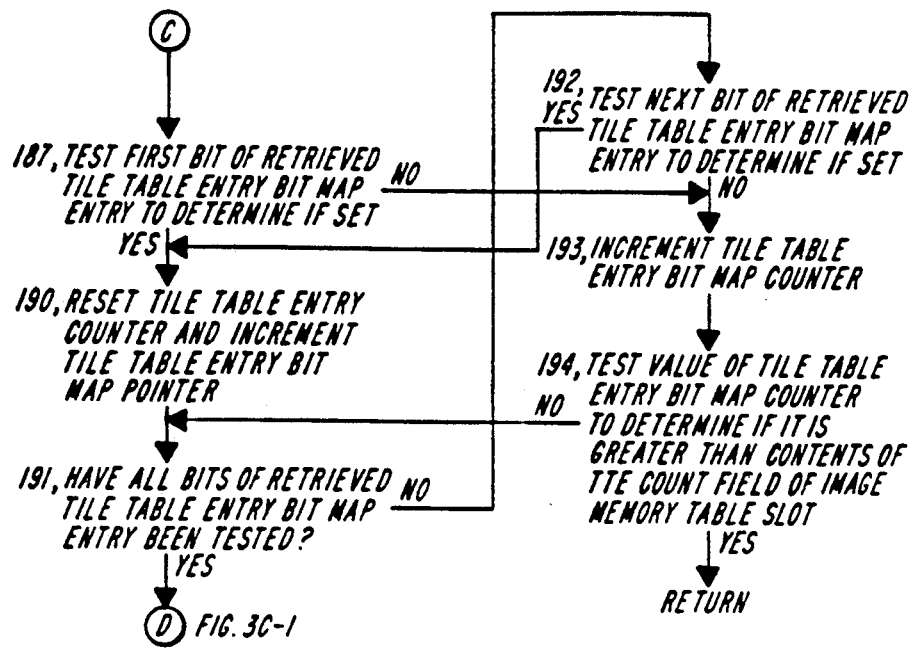
Figures 1, 3D:
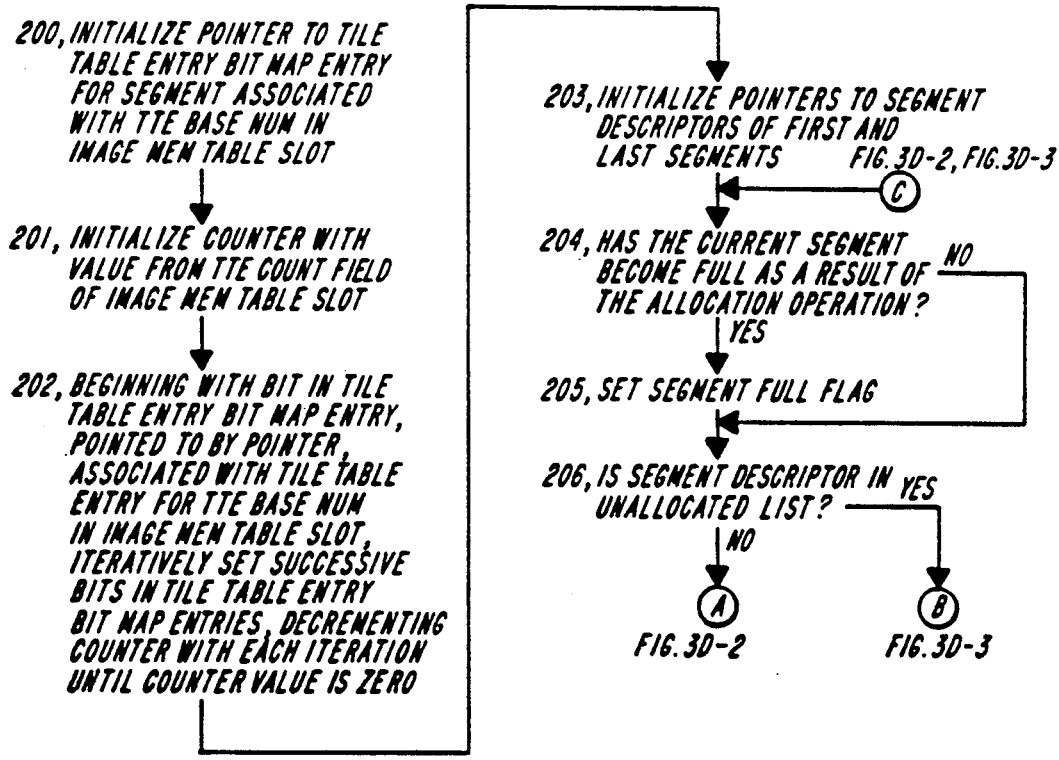

Returning to step 206, if the address space allocation module 16 determines that the segment descriptor is in the unallocated segment list, it steps to a sequence depicted on FIG. 3D-3 to process the segment descriptor. In that sequence, the address space allocation module 16 first unlinks the segment descriptor 32 from the unallocated segment list (step 214) and checks the segment full flag to determine whether the associated segment is full (step 215). If the segment is full, the address space allocation module 16 clears the current segment's segment empty flag (as the segment has been allocated and cannot be empty), and then determines whether the segment descriptor is pointed to by the last segment descriptor pointer created in step 203 (step 216). If the address space allocation module 16 determines that the segment descriptor is pointed to by the last segment descriptor pointer (step 216), it has processed all of the segment descriptors and so it exits (step 217). On the other hand, if the address space allocation module 16 determines, in step 216, that the segment descriptor is not identified by the last segment descriptor pointer, it identifies the next segment descriptor and returns to step 204 to process that segment descriptor 32 (step 220).

Returning to step 215, if the address space allocation module 16 determines that the current segment is not full, it proceeds to link the segment descriptor to the list associated with the value in the segment descriptor's horizontal dimension field 34 (step 221). Thereafter, the address space allocation module 16 sequences to step 216 to clear the segment empty flag and determine whether the segment descriptor is associated with the last segment to be allocated.

After the address space allocation module 16 has established the tile table entries 50 in the process's tile table 15, the application program may use virtual addresses in the newly-allocated virtual address space, and the address translation module 14 may use the entries 50 in translating the VIRT ADRS virtual addresses to PHYS ADRS physical addresses. If the application program 11 later determines that it no longer needs the virtual address space, it may issue an IMAGE MEM FREE image memory free request to free the resources used for the virtual address space. The operations performed by the address space allocation module 16 in connection with an IMAGE MEM FREE image memory free request are generally the reverse of those performed for the IMAGE MEM ALLOC request, except that no searching is required as in the IMAGE MEM ALLOC request.

Figures 1, 4B:
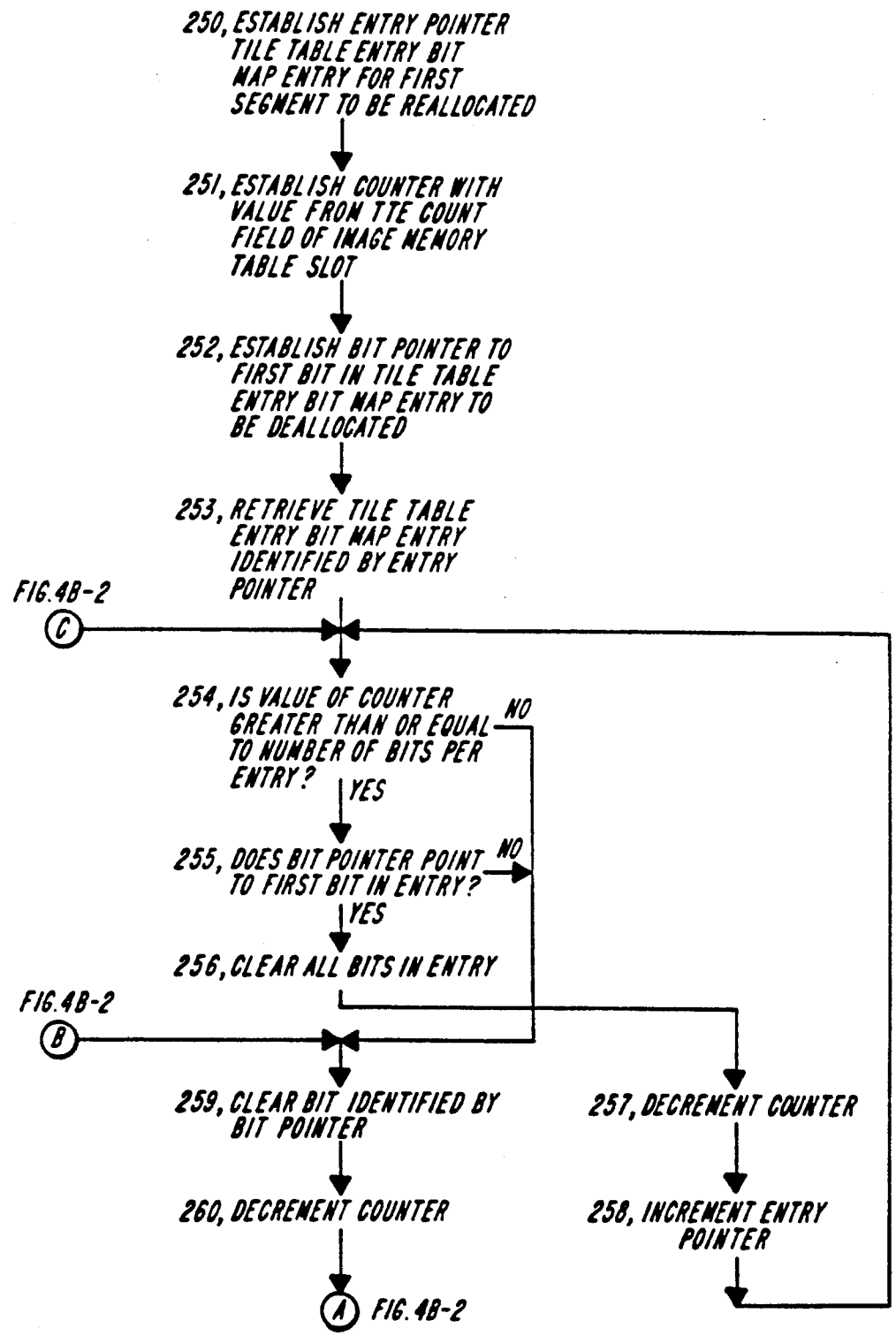
Figures 2, 4B:
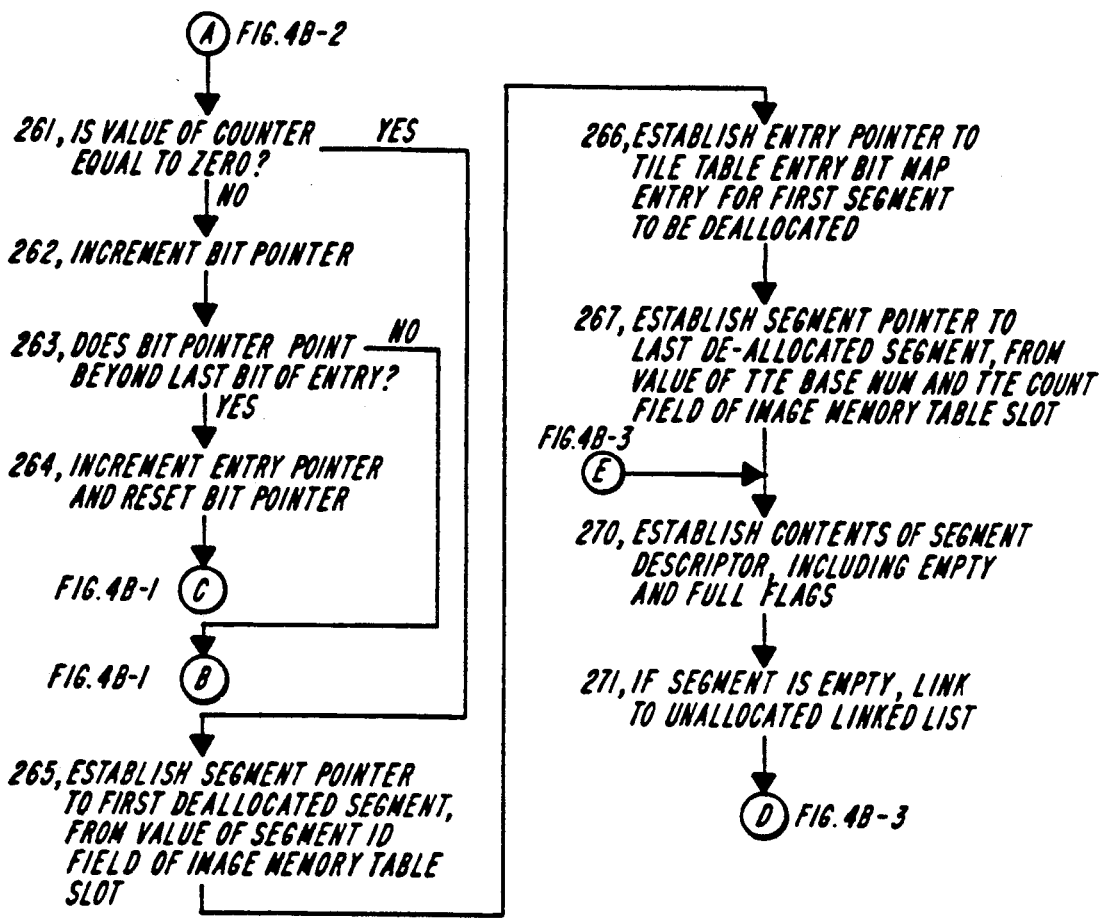
Figures 3, 4B:
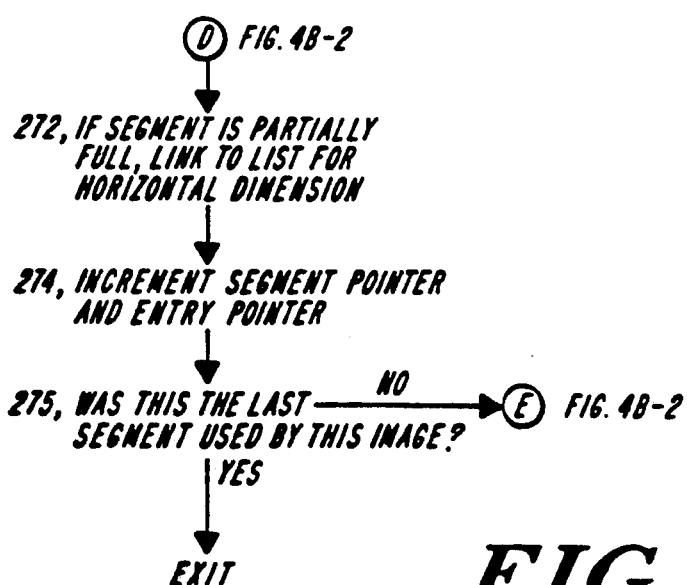

Operations performed by the address space allocation module 16 in response to the IMAGE MEM FREE image memory free request are generally depicted in FIG. 4A, and detailed operations performed in connection with the segment linked list 20 and tile table entry bit map 21 are depicted in FIGS. 4B-1 through 4B-3. With reference to FIG. 4A, the address space allocation module 16 initially tests the reference process count field 71 of the image memory table slot 60, identified by the image memory table slot identification passed as a parameter in the IMAGE MEM FREE image memory free request, to determine whether the image data has been mapped into virtual address spaces for multiple processes (step 240). If so, the address space allocation module 16 just deletes the image use table slot 80 for the process 12 of the application program II that issued the request (step 241). In this operation, since the slots 80 in the image use table 23 are organized in queues hashed according to the process identification value, the address space allocation module 16 may step through the appropriate queue to locate the appropriate slot 80, and delete it from the queue. In addition, the address space allocation module 16 decrements the value in the reference process count field 71 of the image memory table slot 60 to reflect the reduction in the number of processes 12 in whose virtual address spaces the image data is mapped. Following step 241, the address space allocation module 16 exits.

If the address space allocation module 16 determines in step 240 that the image data has been mapped into only one process's virtual address space, it sequences to step 242 to invalidate the appropriate tile table entries 50 in the tile table 15 for the portion of the virtual address space to be freed (step 242). In this operation, the address space allocation module 16 uses the base number in field 66 and the count in field 67 of the image memory table slot 60 to identify the appropriate tile table entries 50. The address space allocation module 16 clears the valid flag 53, sets the ignore flag 57 of the appropriate entries 50, and sets the protection field 54 to identify read only. The address space allocation module 16 then updates the segment linked list 20 and tile table entry bit map 21 (step 243). The detailed operations performed by the address space allocation module 16 during step 243 will be described below in connection with FIGS. 4B-1 through 4B-3.

Following step 243, the address space allocation module 16 frees the swap space in secondary storage in a conventional manner (step 244). The address space allocation module 16 then deletes the image use table slot 80 (step 245), as described above in connection with step 241. It will be appreciated that the image use table 23 will only include one image use table slot 80 for the image data, since otherwise the address space allocation module 16, following step 240, would have sequenced to step 241 if the table 23 included multiple slots 80 for the image data. Thereafter, the address space allocation module 16 deletes the image memory table slot 60, and exits.

As noted in connection with step 243, the address space allocation module 16 updates the segment linked list 20 and tile table entry bit map 21 to reflect the freed virtual address space. The detailed operations performed during this step are depicted in FIGS. 4B-1 through 4B-3. With reference to FIG. 4B-1, the address space allocation module 16 first establishes an entry pointer (step 250), a counter (step 251) and a bit pointer (step 252). The entry pointer points to the entry 40 in the tile table entry bit map 21 to the first segment in the virtual address space to be freed, that is, the segment identified in the segment identification field 65 of the image memory table slot 60. The counter value is initialized by the value from the tile table entry count field 67, and identifies the number of tile table entries to be deallocated. The bit pointer identifies the first bit in entry 40, identified by the entry pointer established in step 250, and is the remainder in the division of the value in the tile table entry base number field 66 by the number of bits in each entry 40.

After the address space allocation module 16 has established the entry pointer, counter and bit pointer, it retrieves the bit map entry 40 identified by the entry pointer (step 253) and then performs steps 254 through 260 through 264 to clear a number, identified by the counter, of successive bits, beginning with the bit identified by the bit pointer, of the entries 40, beginning with the entry 40 identified by the entry pointer. This serves to clear the bits of the tile table entry bit map 21 for the virtual address space to be de-allocated.

More specifically, the address space allocation module 16 first determines whether the value of the counter is greater than or equal to the number of bits in each entry 40 in the tile table entry bit map 21 (step 254). If so, and if the bit pointer points to the first bit in the entry (step 255), the address space allocation module 16 clears all of the bits in the entry 40 identified by the entry pointer created in step 250 (step 256). The address space allocation module 16 then decrements the counter (step 257) to reflect the bits cleared in step 256, that is, by the number of bits per entry 40, and increments the entry pointer to identify the next entry 40 in the tile table entry bit map 21, and returns to step 254 to process the next entry 40.

On the other hand, if the address space allocation module 16 determines in step 254 that the value of the counter is not greater than or equal to the number of bits per entry 40, or if it determines in step 255 that the bit pointer does not point to the first bit in the entry, it sequences to steps 259 through 263 to iteratively clear successive bits, identified by the bit pointer, in the entry 40, identified by the entry pointer, decrementing the counter and incrementing the bit pointer in the entry 40. The address space allocation module 16 first clears the bit identified by the bit pointer (step 259), decrements the counter (step 260) and determines whether the value of the counter is equal to zero (step 261). If the value of the counter decrements to zero, the address space allocation module 16 has cleared all of the bits for the virtual address space to be deallocated. If the value of the counter is not zero, the address space allocation module 16 increments the bit pointer (step 262) and determines whether the bit pointer points beyond the last bit of the entry 40 (step 263). If not, the address space allocation module 16 returns to step 259 to clear the next bit of the entry 40.

When the address space allocation module 16 determines, in step 263, that the bit pointer points beyond the last bit of the entry 40, it has processed all of the bits in the entry, and so it increments the entry pointer and resets the bit pointer and sequences to step 254 to begin processing the next entry 40 in the tile table entry bit map.

It will be appreciated that the address space allocation module 16 will, at some point in processing the contents of the tile table entry bit map 21, determine, in step 261, that the value of the counter has been decremented to zero. At that point, the address space allocation module 16 has reset bits for all of the de-allocated address space, and so it steps to a sequence, beginning with step 265, to process the segment linked list 20. The address space allocation module 16 first establishes a segment pointer (step 265), an entry pointer (step 266) and a last segment pointer (step 267). The segment pointer identifies the first segment to be deallocated, and is identified by the segment identification field 65 in the image memory table slot 60. The entry pointer identifies the first entry in the tile table entry bit map 21, and is determined as described above in connection with step 250. The last segment pointer identifies the last segment to be de-allocated, and is identified by the tile table entry base number field 66 and the tile table entry count field 67 in the image memory table slot 60.

Thereafter, the address space allocation module 16 performs steps 270 through 275 to iteratively process successive segment descriptors 32, beginning with the descriptor 32 associated with the segment identified by the segment pointer created in step 265. The address space allocation module 16 first establishes the contents of the segment descriptor associated with the segment identified by the segment pointer (step 270). The address space allocation module 16, using the entry 40 in the tile table entry bit map 21, determines whether the segment is completely unallocated, and if so, links it to the unallocated linked list, associated with pointer 31(0) (step 271). If the segment is partially full, as identified by the entry 40 in the tile table entry bit map 21, the address space allocation module 16 links it to the list for the appropriate horizontal tile dimension (step 272). The address space allocation module 16 then increments the segment pointer and entry pointer to point to the next segment and entry 40 (step 274), and then compares the values of the segment and last segment pointers (step 275). If the value of the segment pointer exceeds the value of the last segment pointer, the address space allocation module 16 has processed all of the segment descriptors 32 for the de-allocated segments, and so it exits. On the other hand, if the value of the segment pointer is less than or equal to the last segment pointer, the address space allocation module 16 returns to step 270 to process the segment descriptors for the next segment.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed is:

1. A system for allocating virtual address space for array data to be stored in a virtual memory, an attribute of said array being a dimension along an array direction, the system comprising:
   a table that associates segments of said virtual address space with predetermined dimensions of array data, and
   a space allocator for using said table to identify a contiguous portion of said virtual address space for said array data to be stored.

2. The system of claim 1 wherein said array data to be stored has a characteristic one of said predetermined dimensions, and said allocator uses said table to identify segments that have been allocated to store array data having said characteristic dimension.

3. The system of claim 2 wherein said allocator uses said table to identify segments that have not been allocated to store array data if no said segments have been allocated to store array data having said characteristic dimension.

4. The system of claim 3 further comprising a map that identifies, for each said segment, which portions of said segment have been allocated to store array data, and wherein said allocator uses one or more of said identified segments with said map to identify said contiguous portion of said virtual address space.

5. The system of claim 1 wherein said table comprises lists of records for segments that have bene at least partially allocated to store array data, each list being associated with a different predetermined dimension, and each record in each list being associated with a segment with has been at least partially allocated to store array data having the different predetermined dimension associated with said list.

6. The system of claim 5 wherein said table further comprises a list of records for segments that have not been allocated to store any array data.

7. The system of claim 5 wherein, a list includes at least one record identifying another record, thereby comprising a linked list of records.

8. The system of claim 5 wherein each record in said table identifies the different predetermined dimension of the array data that an associated segment has been allocated to store.

9. The system of claim 5 wherein each record in said table identifies whether portions of an associated segment have not been allocated to store array data.

10. The system of claim 9 wherein each record in said table identifies whether an associated segment has not been allocated to store array data.

11. The system of claim 9 wherein each record in said table identifies whether an associated segment has been completely allocated to store array data.

12. The system of claim 5 further comprising a map that identifies portions of a segment which have been allocated to store array data, and
   said allocator uses said map to identify a contiguous portion of said virtual address space.

13. The system of claim 12 wherein said allocator uses said lists of records to identify segments that have been at least partially allocated to store array data having a characteristic one of said predetermined dimensions, and uses said identified segments with said map to identify a contiguous portion of virtual address space.

14. The system of claim 13 wherein said allocator uses said list of records to identify segments that have not been allocated to store array data to identify said contiguous portion of said virtual address space.

15. The system of claim 14 wherein, if said table does not include a list of records for segments that have been at least partially allocated to store array data having said characteristic dimension, said allocator uses said list of records for unallocated segments to identify one or more segments, and uses said one or more identified segments with said map to identify said contiguous portion of said virtual address space.

16. The system of claim 14 wherein, if said contiguous portion of said virtual address space includes an unallocated segment, said allocator moves the record associated with said segment from the list of records associated with unallocated segments to a list associated with said characteristic dimension.

17. The system of claim 16 wherein, if said table did not include a list for said characteristic dimension, said allocator causes said lists to be created by designating said record as the first record in said list.

18. The system of claim 5 further comprising a map that identifies, for each said segment, which portions of said segment have been allocated to store array data, and wherein said allocator includes a deallocator for freeing a contiguous portion of said virtual address space using said table and said map when array data stored in said contiguous portion is to be removed from said memory.

19. The system of claim 18 wherein a record contains information about a segment that was allocated to store said array data to be removed, said deallocator causing said record to be updated when said contiguous portion of said virtual address space is freed.

20. The system of claim 19 wherein said information identifies whether said segment is completely allocated or is completely unallocated.

21. The system of claim 20 wherein said deallocator causes said record to be moved to the list of records for segments that have not been allocated to store any array data if said segment becomes completely unallocated when said contiguous portion of said virtual address space is freed.

22. The system of claim 1 wherein said segments comprise contiguous blocks for storing array data, said system further comprising a map that identifies which portions of said segments have been allocated to store array data, and wherein each said segment comprises a number of contiguous blocks for storing said array data, said map being arranged to identify which ones of said contiguous blocks have bene allocated to store array data.

23. The system of claim 22 wherein said map comprises an entry associated with each said segment and a plurality of elements associated with each said segment, each element indicating whether a block of an associated element has been allocated to store array data.

24. The system of claim 23 wherein said array data to be stored has a characteristic one of said predetermined dimensions said allocator testing said map based on said characteristic dimension to identify one or more contiguous elements in said map associated with one or more contiguous blocks.

25. The system of claim 24 wherein said allocator uses said table to identify one or more entries of said map that are associated with segments that have at least partially been allocated to store array data having said characteristic dimension, and to test the elements or said identified entries to identify said one or more contiguous elements associated with said one or more contiguous blocks.

26. The system of claim 25 wherein, if no said segments have been allocated to store array data having said characteristic dimension, said allocator uses said table to identify one or more entries that are associated with segments that have not been allocated to store array data, and tests the elements of said identified entries to identify said one or more contiguous elements associated with said one or more contiguous blocks.

27. The system of claim 25 wherein said allocator ignores, during said testing of elements of said identified entries in the map that are associated with segments that have been at least partially allocated to store array data having a dimension different from said characteristic dimension.

28. The system of claim 27 wherein said allocator tests said identified entries by counting the number of contiguous elements associated with blocks that have not been allocated to store array data and compare the number counted with the number of blocks in said characteristic dimension.

29. The system of claim 28 wherein said allocator starts said counting in the first entry identified by said table that is associated with a segment that has been at least partially allocated to store array data having said characteristic dimension.

30. The system of claim 29 wherein said allocator starts said counting at the first element in said first entry that is associated with an unallocated block in said segment.

31. The system of claim 29 wherein, if no said segments have been allocated to store array data having said characteristic dimension, said allocator starts said counting at the first element in the first entry identified by said table that is associated with a segment that has not been allocated to store array data.

32. The system of claim 30 wherein, if said allocator has reached a count that is less than the number of blocks in said characteristic dimension when said allocator has tested all elements in said first entry, said allocator continues counting elements in the entry associated with a next contiguous segment if said next segment is either unallocated or has been partially allocated to store array data having said characteristic dimension.

33. The system of claim 32 wherein said allocator restarts said counting if it finds an element associated with an allocated block.

34. The system of claim 24 wherein said allocator includes a deallocator for freeing a contiguous portion of said virtual address space using said table and said map when array data stored in said contiguous portion is to be removed from said memory.

35. The system of claim 34 wherein said deallocator uses said table to identify at least one segment that contains at least some of said virtual address space to be freed, and to access the entry of said map that is associated with said segment to identify contiguous elements of one or more entries in said map that are associated with the blocks that comprise the contiguous portion of said virtual address space to be freed.

36. The system of claim 35 wherein said deallocator causes each one of said contiguous elements to indicate that its associated block has not been allocated to store array data when said contiguous portion of said virtual address space has been freed.

37. The system of claim 1 further comprising a map that identifies, for each said segment, which portions of said segment have been allocated to store array data, and wherein said array data to be stored has a characteristic one of said predetermined dimensions, said segments being contiguous within said virtual address space and each said segment comprising a predetermined number of contiguous blocks for storing array data, said table comprising lists of records for segments that have been at least partially allocated to store array data, each list being associated with a different predetermined dimension, and each record in each list being associated with a segment which has been at least partially allocated to store array data and identifying another record in said list, said table further including a list of records for segments that have not been allocated to store array data, said map comprising an entry associated with each said segment and a plurality of elements in each entry associated with the contiguous blocks in the corresponding segment, each element indicating whether its associated block has been allocated to store array data, and wherein said space allocator uses said lists of records to identify segments that have been at least partially allocated to store array data having said characteristic dimension or that have not been allocated to store array data to identify one or more candidate segments for storing said array data, said space allocator further testing the elements of bit map entries that correspond to said candidate segments to identify one or more contiguous elements associated with one or more contiguous blocks that have not been allocated, and to determine if said one or more contiguous blocks define a dimension that is at least as large as said characteristic dimension.

38. The system of claim 37 wherein said allocator comprises a deallocator for freeing a contiguous portion of said virtual address space, said deallocator using said lists of records to identify at least one segment that contains at least some of said virtual address space to be freed, and, to access an entry of said map that is associated with said segment to identify contiguous elements that are associated with the blocks that comprise the contiguous portion of said virtual address space to be freed, said deallocator further causing each one of said identified contiguous elements to indicate that its associated block has not been allocated to store array data when said contiguous portion of said virtual address space has been freed, and said deallocator further updating one or more records that identify one or more segments that correspond to the entries in the map that contain said identified contiguous elements to indicate that space in said segments has been deallocated.

39. A process for allocating virtual address space for array data to be stored in a virtual memory, an attribute of said array being a dimension along an array direction; the process comprising the steps of:

associating segments of said virtual address space with predetermined dimensions of array data in a table, and using said table to identify a contiguous portion of said virtual address space for said array data to be store.

40. The process of claim 39 wherein said array data to be stored has a characteristic one of said predetermined dimensions, said segments being contiguous within said virtual address space and each said segment comprising a predetermined number of contiguous blocks for storing array data.

41. The process of claim 40 wherein said step of associating comprises a step of establishing lists of records for segments that have been at least partially allocated to store array data, each list being associated with a different predetermined dimension, and each record in each list being associated with a segment which has been at least partially allocated to store array data having the array data dimension associated with said list and identifying another record in said list.

42. The process of claim 41 wherein said step of associating further includes a step of establishing a list of records for segments that have not been allocated to store array data.

43. The process of claim 42 wherein said step of using comprises a step of identifying from said lists of records segments that have been at least partially allocated to store array data having said characteristic dimension or that have not been allocated to store array data to identify one or more candidate segments for storing said array data.

44. The process of claim 43 further comprising steps of:

maintaining a map that identifies, for each said segment, which portions of said segment have been allocated to store array data, and providing an entry in said map associated with each said segment and a plurality of elements in each entry associated with the contiguous blocks in the corresponding segment, each element indicating whether its associated block has been allocated to store array data.

45. The process of claim 44 wherein said step of using further comprises a step of testing the elements of the map entries that correspond to said candidate segments to identify one or more contiguous elements associated with one or more contiguous blocks that have not been allocated, and determining if said one or more contiguous blocks define a dimension that is at least as large as said characteristic dimension.

46. The process of claim 45 further comprising a step of freeing a contiguous portion of said virtual address space, said freeing step comprising steps of:

using said lists of records to identify at least one segment that contains at least some of said virtual address space to be freed, and accessing the entry of said map that is associated with said at least one segment to identify contiguous elements that are associated with the blocks that comprises the contiguous portion of said virtual address space to be freed, causing each one of said identified contiguous elements to indicate that its associated block has not been allocated to store array data when said contiguous portion of said virtual address spaced has been freed, and updating one or more records that identify one or more segments that correspond to the entries in the map that contain said identified contiguous elements to indicate that space in said one or more segments has been deallocated.

* * * * *